United States Patent
Sawada

(10) Patent No.: US 8,140,458 B2
(45) Date of Patent: Mar. 20, 2012

(54) INFORMATION PROCESSING APPARATUS, INFORMATION PROCESSING METHOD, AND COMPUTER PROGRAM

(75) Inventor: Tsutomu Sawada, Tokyo (JP)

(73) Assignee: Sony Corporation, Tokyo (JP)

( * ) Notice: Subject to any disclaimer, the term of this patent is extended or adjusted under 35 U.S.C. 154(b) by 798 days.

(21) Appl. No.: 12/176,921

(22) Filed: Jul. 21, 2008

(65) Prior Publication Data

US 2009/0030865 A1    Jan. 29, 2009

(30) Foreign Application Priority Data

Jul. 25, 2007 (JP) ................. P2007-193930

(51) Int. Cl.
*G06F 17/00* (2006.01)
*G06N 5/02* (2006.01)

(52) U.S. Cl. ........................................... 706/46
(58) Field of Classification Search .......... 706/46
See application file for complete search history.

(56) References Cited

U.S. PATENT DOCUMENTS

| 6,882,959 B2 * | 4/2005 | Rui et al. ............. 702/179 |
| 7,536,029 B2 * | 5/2009 | Choi et al. ............ 382/103 |

FOREIGN PATENT DOCUMENTS

| JP | 2002-264051 | 9/2002 |
| JP | 2005-271137 | 10/2005 |
| JP | 2008-26974 | 2/2008 |

OTHER PUBLICATIONS

Timothy J. Hazen, "Multy-Modal Face and Speaker Identification on a Handheld Device", Proc. of Workshop on Multimodal User Authentication, pp. 113-120, Dec. 11-12, 2003, Santa Barbara, California.*
Office Action mailed on Sep. 13, 2011, in Japanese Patent Application No. 2007-193930; original in Japanese and English translation.
H. Asoh, Bayesian inference with particle filters for user interface. Institute of Electronics, Information, and Communication Engineers, Oct. 11, 2005, 105(342), pp. 31-36.
Y. Kobayashi et al., 3D head tracking using the particle filter with cascaded classifiers, MIRU2006, Institute of Electronics, Information and Communication Engineers, Jul. 2006, pp. 222-228.

* cited by examiner

*Primary Examiner* — Alan Chen
*Assistant Examiner* — Ilya Traktovenko
(74) *Attorney, Agent, or Firm* — Finnegan, Henderson, Farabow, Garrett & Dunner, L.L.P.

(57) ABSTRACT

Information processing apparatus in which information such as images and sounds of an external environment are processed for analyzing a position, identity, and the like of a person who is uttering words; information processing methods for executing the analysis processing in an information processing apparatus; and computer-readable media for causing an information processing apparatus to execute analysis processing are disclosed.

21 Claims, 12 Drawing Sheets

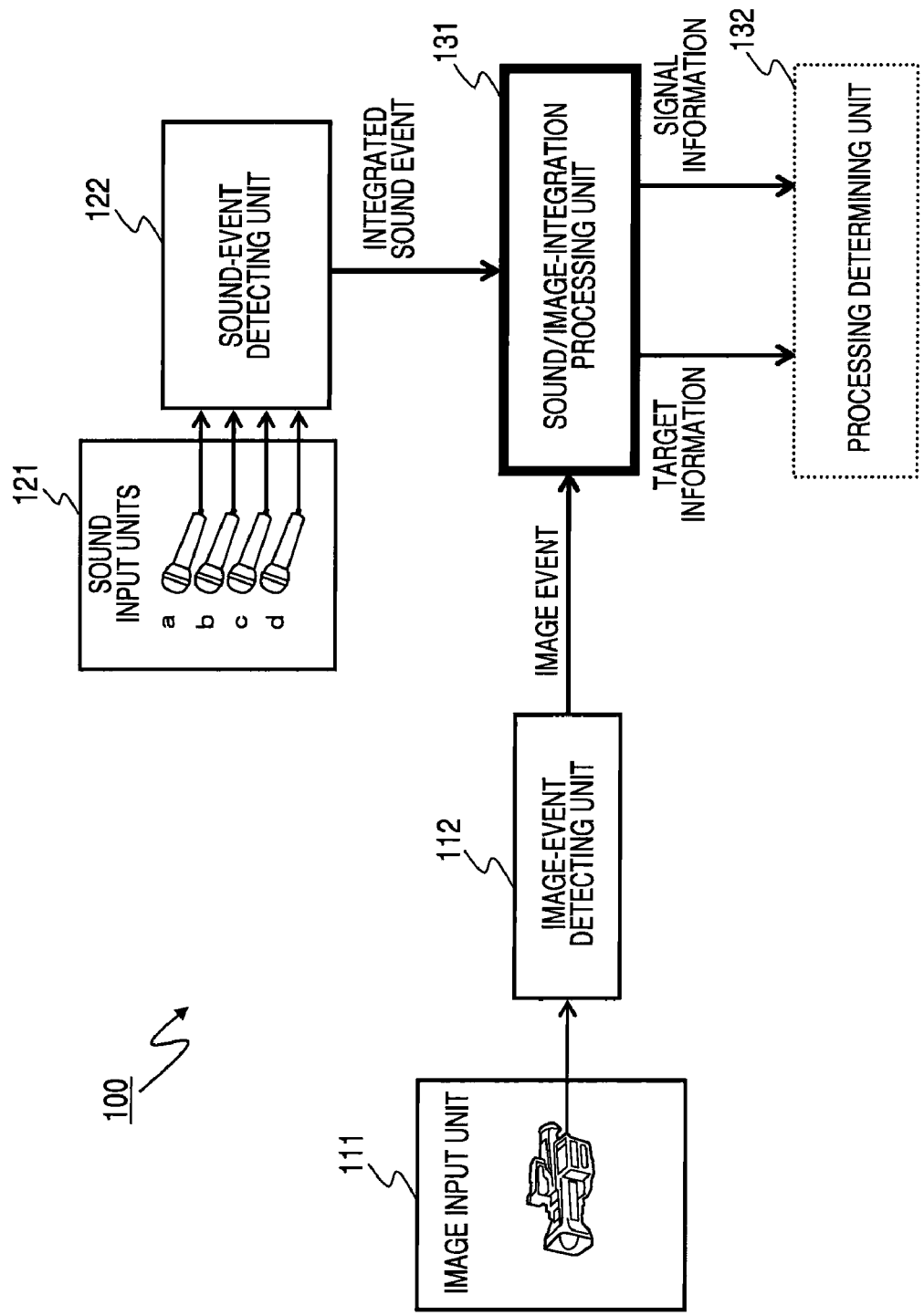

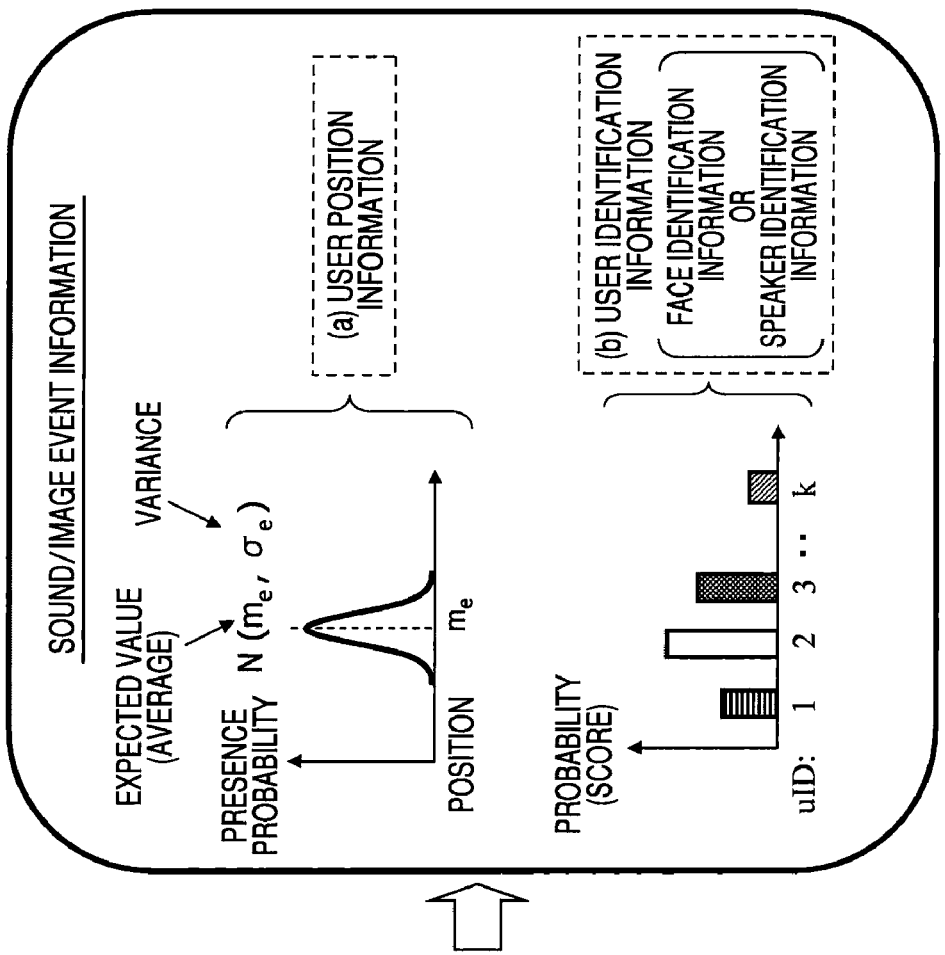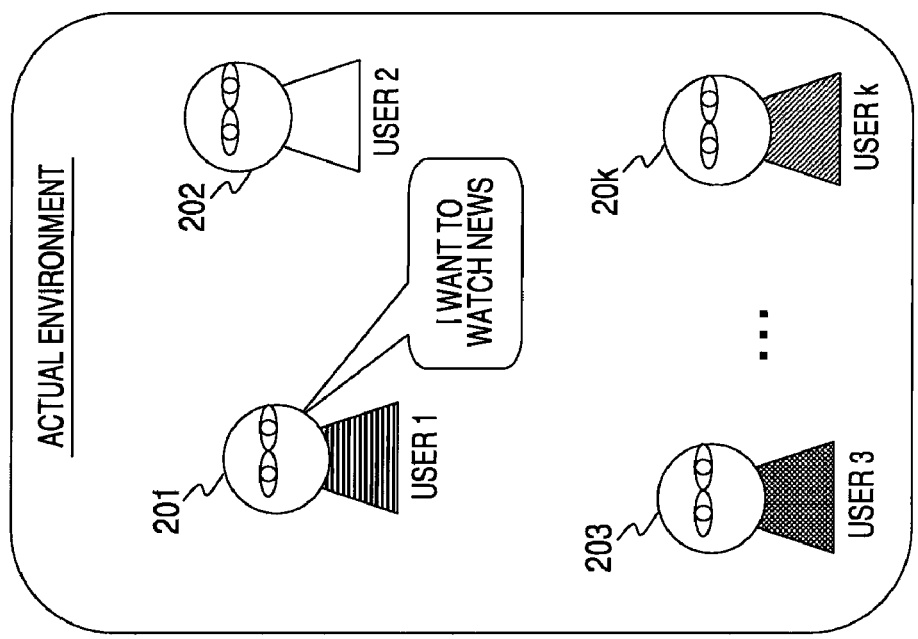

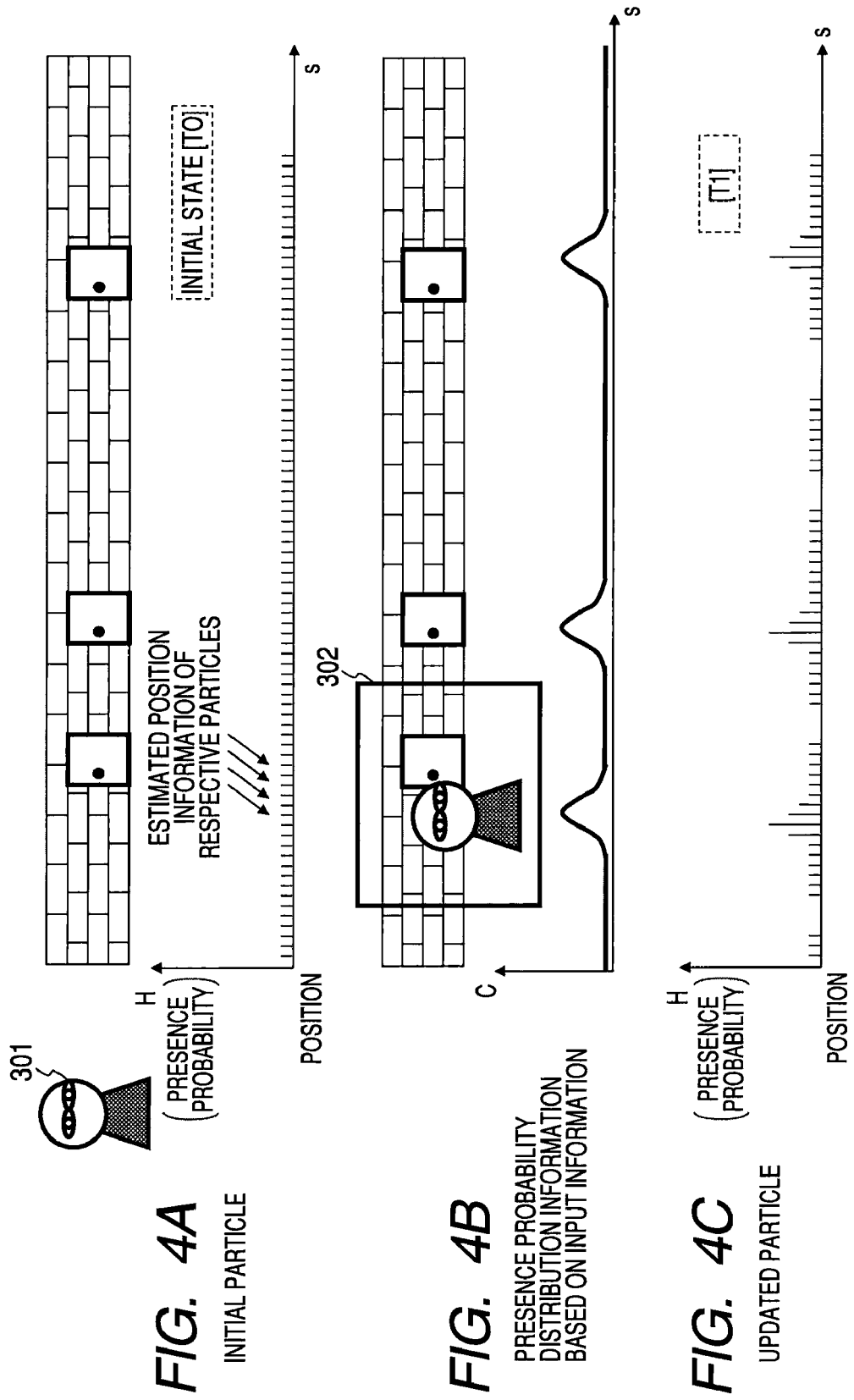

INFORMATION PROCESSING APPARATUS, INFORMATION PROCESSING METHOD, AND COMPUTER PROGRAM

CROSS-REFERENCES TO RELATED APPLICATIONS

The present invention contains subject matter related to Japanese Patent Application JP 2007-193930 filed in the Japanese Patent Office on Jul. 25, 2007, the entire contents of which being incorporated herein by reference.

BACKGROUND OF THE INVENTION

1. Field of the Invention

The present invention relates to an information processing apparatus, an information processing method, and a computer program, and, more particularly to an information processing apparatus that is inputted with information from the outside, for example, information such as an image and sound and executes an analysis of an external environment based on the input information and, specifically, analysis processing for analyzing a position, identity, and the like of a person who is uttering words, an information processing method for executing the analysis processing in the information processing apparatus, and a computer program for causing the information processing apparatus to execute the analysis processing.

2. Description of the Related Art

A system that performs processing between a person and an information processing apparatus such as a PC or a robot, for example, communication and interactive processing is called a man-machine interaction system. In the man-machine interaction system, the information processing apparatus such as the PC or the robot is inputted with image information or sound information and performs an analysis based on the input information in order to recognize actions of the person, for example, motions and words of the person.

When the person communicates information, the person utilizes not only words but also various channels such as a look and an expression as information communication channels. If a machine can analyze all of such channels, communication between the person and the machine can reach the same level as communication among people. An interface that analyzes input information from such plural channels (also referred to as modalities or modals) is called a multi-modal interface, which has been actively developed and researched in recent years.

For example, when image information photographed by a camera and sound information acquired by a microphone is inputted and analyzed, to perform a more detailed analysis, it is effective to input a large amount of information from plural cameras and plural microphones set at various points.

As a specific system, for example, a system described below is assumed. It is possible to realize a system in which an information processing apparatus (a television) is inputted with an image and sound of users (a father, a mother, a sister, and a brother) in front of the television via a camera and a microphone, analyzes, for example, positions of the respective users and which of the users uttered words, and performs processing corresponding to analysis information, for example, zooming-in of the camera on the user who spoke or accurate response to the user who spoke.

Most of general man-machine interaction systems in the past perform processing for deterministically integrating information from plural channels (modals) and determining where respective plural users are present, who the users are, and who uttered a signal. Examples of a related art that discloses such a system include JP-A-2005-271137 and JP-A-2002-264051.

However, a method of processing for deterministically integrating information using uncertain and asynchronous data inputted from a microphone and a camera performed in a system in the past lacks robustness. Only less accurate data is obtained with the method. In an actual system, sensor information that can be acquired in an actual environment, i.e., an input image from a camera and sound information inputted from a microphone are uncertain data including various extra information, for example, noise and unnecessary information. When an image analysis and a sound analysis are performed, processing for efficiently integrating effective information from such sensor information is important.

SUMMARY OF THE INVENTION

Therefore, it is desirable to provide, in a system that performs an analysis of input information from plural channels (modalities or modals) and, specifically, processing for identifying positions and the like of people around the system, an information processing apparatus, an information processing method, and a computer program for improving robustness and performing a highly accurate analysis by performing probabilistic processing for uncertain information included in various kinds of input information such as image and sound information to perform processing for integrating the information into information estimated to be higher in accuracy.

According to an embodiment of the present invention, there is provided an information processing apparatus including plural information input units that input information including image information or sound information in an actual space, an event detecting unit that generates event information including estimated position information and estimated identification information of users present in the actual space by analyzing the information inputted from the information input unit, and an information-integration processing unit that sets probability distribution data of hypotheses concerning position and identification information of the users and executes generation of analysis information including user position information and user identification information of the users present in the actual space by updating and selecting the hypotheses on the basis of the event information.

Preferably, the information-integration processing unit inputs the event information generated by the event detecting unit, executes particle filtering processing to which plural particles set with plural targets corresponding to virtual users are applied, and generates analysis information including the user position information and the user identification information of the users present in the actual space.

Preferably, the event detecting unit generates event information including estimated position information of users including a Gaussian distribution and user confidence factor information indicating probability values corresponding to the users, and the information-integration processing unit holds particles set with plural targets having user position information including a Gaussian distribution corresponding to virtual users and user confidence factor information indicating probability values corresponding to the users, calculates event-target likelihoods that are indication values of similarities between the targets-set for the respective particles and the event information, and executes particle setting processing with the target having a higher one of the event-target likelihoods preferentially set as an event occurrence source hypothesis target.

Preferably, the information-integration processing unit calculates sum data of the event-target likelihoods and particle weights set for the respective particles as target weights and executes particle setting processing with the target having a larger one of the target weights preferentially set as an event occurrence source hypothesis target.

Preferably, the information-integration processing unit calculates likelihoods between event occurrence source hypothesis targets set for the respective particles and the event information inputted from the event detecting unit and sets values corresponding to levels of the likelihoods for the respective particles as particle weights.

Preferably, the information-integration processing unit executes re-sampling processing for preferentially reselecting the particle having a larger one of the particle weights and performs update processing for the particle.

Preferably, the information-integration processing unit executes update processing for the targets set for the respective particles taking into account elapsed time.

Preferably, the information-integration processing unit performs, concerning event occurrence source hypothesis targets set for the respective particles, update processing to which the event information generated by the event detecting unit is applied.

Preferably, the information-integration processing unit generates target information in which an integrated sum of target data and the particle weights set for the respective particles is set as user position information and user identification information corresponding to the respective targets.

Preferably, the information-integration processing unit generates signal information as a probability value of an event occurrence source according to the numbers of event occurrence source hypothesis targets set for the respective particles.

Preferably, the information-integration processing unit generates a provisional target having user position information and user identification information including uniform data and performs, when a likelihood between the provisional target and the event information generated by the event detecting unit is a value larger than an event-target likelihood corresponding to an existing target, processing for adding the provisional target to the respective particles anew.

Preferably, the information-integration processing unit executes, when a peak value of Gaussian distribution data as user position information included in an integrated sum of target data and the particle weights set for the respective particles is smaller than a threshold set in advance, processing for deleting the target.

According to another embodiment of the present invention, there is provided an information processing method for executing information analysis processing in an information processing apparatus, the information processing method including an information inputting step in which plural information input units input information including image information or sound information in an actual space, an event detecting step in which an event detecting unit generates event information including estimated position information and estimated identification information of users present in the actual space by analyzing the information inputted in the information inputting step, and an information-integration processing step in which an information-integration processing unit sets probability distribution data of hypotheses concerning position and identification information of the users and executes generation of analysis information including user position information and user identification information of the users present in the actual space by updating and selecting the hypotheses on the basis of the event information.

Preferably, the information-integration processing step is a step of inputting the event information generated by the event detecting unit, executing particle filtering processing to which plural particles set with plural targets corresponding to virtual users are applied, and generating analysis information including the user position information and the user identification information of the users present in the actual space.

Preferably, the event detecting step is a step of generating event information including estimated position information of users including a Gaussian distribution and user confidence factor information indicating probability values corresponding to the users, the information-integration processing unit holds particles set with plural targets having user position information including a Gaussian distribution corresponding to virtual users and user confidence factor information indicating probability values corresponding to the users, and the information-integration processing step is a step of calculating event-target likelihoods that are indication values of similarities between the targets set for the respective particles and the event information and executing particle setting processing with the target having a higher one of the event-target likelihoods preferentially set as an event occurrence source hypothesis target.

Preferably, the information-integration processing step is a step of calculating sum data of the event-target likelihoods and particle weights set for the respective particles as target weights and executing particle setting processing with the target having a larger one of the target weights preferentially set as an event occurrence source hypothesis target.

Preferably, the information-integration processing step is a step of calculating likelihoods between event occurrence source hypothesis targets set for the respective particles and the event information inputted from the event detecting unit and setting values corresponding to levels of the likelihoods for the respective particles as particle weights.

Preferably, the information-integration processing step is a step of executing re-sampling processing for preferentially reselecting the particle having a larger one of the particle weights and performing update processing for the particle.

Preferably, the information-integration processing step is a step of executing update processing for the targets set for the respective particles taking into account elapsed time.

Preferably, the information-integration processing step is a step of performing, concerning event occurrence source hypothesis targets set for the respective particles, update processing to which the event information generated by the event detecting unit is applied.

Preferably, the information-integration processing step is a step of generating target information in which an integrated sum of target data and the particle weights set for the respective particles is set as user position information and user identification information corresponding to the respective targets.

Preferably, the information-integration processing step is a step of generating signal information as a probability value of an event occurrence source according to the numbers of event occurrence source hypothesis targets set for the respective particles.

Preferably, the information-integration processing step includes a step of generating a provisional target having user position information and user identification information including uniform data and performing, when a likelihood between the provisional target and the event information generated by the event detecting unit is a value larger than an event-target likelihood corresponding to an existing target, processing for adding the provisional target to the respective particles anew.

Preferably, the information-integration processing step includes a step of executing, when a peak value of Gaussian distribution data as user position information included in an integrated sum of target data and the particle weights set for the respective particles is smaller than a threshold set in advance, processing for deleting the target.

According to still another embodiment of the present invention, there is provided a computer program for causing an information processing apparatus to execute information analysis processing, the computer program causing the information processing apparatus to execute an information inputting step of causing plural information input units to input information including image information or sound information in an actual space, an event detecting step of causing an event detecting unit to generate event information including estimated position information and estimated identification information of users present in the actual space by analyzing the information inputted in the information inputting step, and an information-integration processing step of causing an information-integration processing unit to set probability distribution data of hypotheses concerning position and identification information of the users and execute generation of analysis information including user position information and user identification information of the users present in the actual space by updating and selecting the hypotheses on the basis of the event information.

The computer program according to the embodiment of the present invention is, for example, a computer program that can be provided to a general-purpose computer system, which can execute various program codes, through a storage medium provided in a computer-readable format or a communication medium. By providing such a program in a computer-readable format, processing corresponding to the program is realized on the computer system.

Other objects, features, and advantages of the present invention will be apparent from a more detailed explanation based on embodiments of the present invention described later and the accompanying drawings. In this specification, a system is a configuration of a logical set of plural apparatuses and is not limited to a system in which apparatuses having individual configurations are provided in an identical housing.

According to an embodiment of the present invention, event information including estimated positions and estimated identification data of users is inputted on the basis of image information or sound information acquired by a camera or a microphone, particle filtering processing to which plural particles set with plural targets are applied is performed, and position and identification information of the users is generated on the basis of update and selection of hypotheses by filtering. According to this embodiment, it is possible to efficiently leave most likely information even if uncertain and asynchronous position information and identification information are inputted as input information and it is possible to efficiently and surely generate user position and user identification information.

BRIEF DESCRIPTION OF THE DRAWINGS

FIG. 2 is a diagram for explaining the structure and processing of the information processing apparatus according to the embodiment;

FIGS. 3A and 3B are diagrams for explaining an example of information generated and inputted to a sound/image-integration processing unit 131 by a sound-event detecting unit 122 or an image-event detecting unit 112;

FIGS. 4A to 4C are diagrams for explaining a basic processing example to which a particle filter is applied;

DESCRIPTION OF THE PREFERRED EMBODIMENTS

Figure 1:
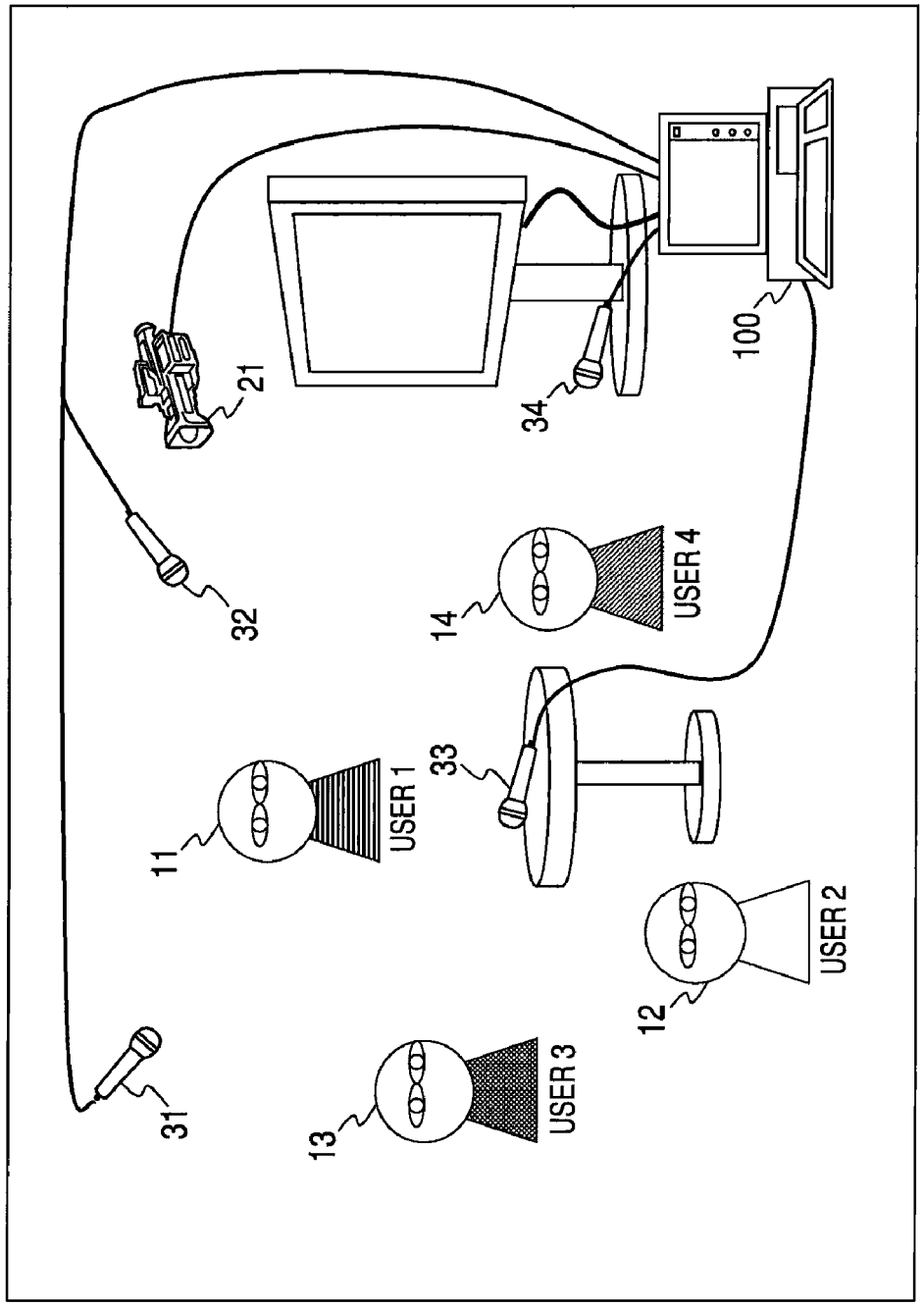
FIG. 1 is a diagram for explaining an overview of processing executed by an information processing apparatus according to an embodiment of the present invention.

Details of an information processing apparatus, an information processing method, and a computer program according to an embodiment of the present invention will be hereinafter explained with reference to the accompanying drawings.

First, an overview of processing executed by the information processing apparatus according to the embodiment is explained with reference to FIG. 1. An information processing apparatus 100 according to this embodiment is inputted with image information and sound information from sensors that input environmental information, for example, a camera 21 and plural microphones 31 to 34 and performs an analysis of an environment on the basis of the input information. Specifically, the information processing apparatus 100 performs an analysis of positions of plural users 1 to 4 (11 to 14) and identification of the users in the positions.

In an example shown in the figure, for example, when the users 1 to 4 (11 to 14) are a father, a mother, a sister, and a brother of a family, the information processing apparatus 100 performs an analysis of image information and sound information inputted from the camera 21 and the plural microphones 31 to 34 and identifies positions where the four users 1 to 4 are present and which of the father, the mother, the sister, and the brother the users in the respective positions are. An identification processing result is used for various kinds of processing, for example, processing for zooming-in of a camera on a user who spoke and a response from a television to the user who spoke.

Main processing of the information processing apparatus 100 according to this embodiment is user identification processing performed as processing for identifying positions of users and identifying the users on the basis of input information from plural information input units (the camera 21 and the microphones 31 to 34). Processing for using a result of the identification is not specifically limited. Various kinds of uncertain information are included in the image information or the sound information inputted from the camera 21 or the plural microphones 31 to 34. The information processing apparatus 100 according to this embodiment performs probabilistic processing for the uncertain information included in these kinds of input information and performs processing for integrating the input information into information estimated as high in accuracy. Robustness is improved by this estimation processing and a highly accurate analysis is performed.

An example of the structure of the information processing apparatus 100 is shown in FIG. 2. The information processing apparatus 100 has an image input unit (a camera) 111 and plural sound input unit (microphones) 121a to 121d as input devices. Image information is inputted from the image input unit (the camera) 111 and sound information is inputted from the sound input units (the microphones) 121. The information processing apparatus 100 performs an analysis on the basis of these kinds of input information. The respective plural sound input units (microphones) 121a to 121d are arranged in various positions as shown in FIG. 1.

The sound information inputted from the plural microphones 121a to 121d is inputted to a sound/image-integration processing unit 131 via a sound-event detecting unit 122. The sound-event detecting unit 122 analyzes and integrates the sound information inputted from the plural sound inputting units (microphones) 121a to 121d arranged in plural different positions. Specifically, the sound-event detecting unit 122 generates, on the basis of the sound information inputted from the sound input units (the microphones) 121a to 121d, user identification information indicating a position of generated sound and which of the users generated the sound and inputs the user identification information to the sound/image-integration processing unit 131.

Specific processing executed by the information processing apparatus 100 is, for example, processing for identifying which of the users 1 to 4 spoke in which position in an environment in which plural users are present as shown in FIG. 1, i.e., performing user position and user identification and processing for specifying an event occurrence source such as a person who uttered voice.

The sound-event detecting unit 122 analyzes the sound information inputted from the plural sound input units (microphones) 121a to 121d arranged in the plural different positions and generates position information of sound generation sources as probability distribution data. Specifically, the sound-event detecting unit 122 generates expected values and variance data $N(m_e, \sigma_e)$ concerning sound source directions. The sound-event detecting unit 122 generates user identification information on the basis of comparison processing with characteristic information of user voices registered in advance. The identification information is also generated as a probabilistic estimated value. Characteristic information concerning voices of plural users, which should be verified, is registered in advance in the sound-event detecting unit 122. The sound-event detecting unit 122 executes comparison processing of input sound and registered sound, performs processing for judging which user's voice the input sound is with a high probability, and calculates posterior probabilities or scores for all the registered users.

In this way, the sound-event detecting unit 122 analyzes the sound information inputted from the plural sound input units (microphones) 121a to 121d arranged in the plural different positions, generates integrated sound event information from the probability distribution data generated from the position information of sound generation sources and the user identification information including the probabilistic estimated value, and inputs the integrated sound event information to the sound/image-integration processing unit 131.

On the other hand, the image information inputted from the image input unit (the camera) 111 is inputted to the sound/image-integration processing unit 131 via the image-event detecting unit 112. The image-event detecting unit 112 analyzes the image information inputted from the image input unit (the camera) 111, extracts faces of people included in the image, and generates position information of the faces as probability distribution data. Specifically, the image-event detecting unit 112 generates expected values and variance data $N(m_e, \sigma_e)$ concerning positions and directions of the faces. The image-event detecting unit 112 generates user identification information on the basis of comparison processing with characteristic information of user faces registered in advance. The identification information is also generated as a probabilistic estimated value. Characteristic information concerning faces of plural users, which should be verified, is registered in advance in the image-event detecting unit 112. The image-event detecting unit 112 executes comparison processing of characteristic information of an image of a face area extracted from an input image and the registered characteristic information of face images, performs processing for judging which user's face the image of the face area is with a high probability, and calculates posterior probabilities or scores for all the registered users.

A technique known in the past is applied to the sound identification, face detection, and face identification processing executed in the sound-event detecting unit 122 and the image-event detecting unit 112. For example, the techniques disclosed in the following documents can be applied as the face detection and face identification processing:

Kotaro Sabe and Ken-ichi Hidai, "Learning of an Actual Time Arbitrary Posture and Face Detector Using a Pixel Difference Characteristic", Tenth Image Sensing Symposium Lecture Proceedings, pp. 547 to 552, 2004; and JP-A-2004-302644 [Title of the Invention: Face Identification Apparatus, Face Identification Method, Recording Medium, and Robot Apparatus].

The sound/image-integration processing unit 131 executes processing for probabilistically estimating, on the basis of the input information from the sound-event detecting unit 122 or the image-event detecting unit 112, where the plural users are present, respectively, who are the users, and who uttered a signal such as sound. This processing is explained in detail later. The sound/image-integration processing unit 131 outputs, on the basis of the input information from the sound-event detecting unit 122 or the image-event detecting unit 112, the following information to a processing determining unit 132:

(a) target information as estimation information indicating where the plural users are present, respectively, and who are the users; and (b) signal information indicating an event occurrence source such as a user who spoke.

The processing determining unit 132 receives results of these kinds of identification processing and executes processing using the identification processing results. For example, the processing determining unit 132 performs processing such as zooming-in of a camera on a user who spoke and a response from a television to the user who spoke.

As described above, the sound-event detecting unit 122 generates position information of sound generation sources as probability distribution data. Specifically, the sound-event detecting unit 122 generates expected values and variance data $N(m_e, \sigma_e)$ concerning sound source directions. The sound-event detecting unit 122 generates user identification information on the basis of comparison processing with characteristic information of user voices registered in advance and inputs the user identification information to the sound/image-integration processing unit 131. The image-event detecting unit 112 extracts faces of people included in an image and generates position information of the faces as probability distribution data. Specifically, the image-event detecting unit 112 generates expected values and variance data N ($m_e$, $\sigma_e$) concerning positions and directions of the faces. The image-event detecting unit 112 generates user identification information on the basis of comparison processing with characteristic information of user faces registered in advance and inputs the user identification information to the sound/image-integration processing unit 131.

An example of information generated and inputted to the sound/image-integration processing unit 131 by the sound-event detecting unit 122 or the image-event detecting unit 112 is explained with reference to FIGS. 3A and 3B. FIG. 3A shows an example of an actual environment including a camera and microphones same as the actual environment explained with reference to FIG. 1. Plural users 1 to k (201 to 20k) are present in the actual environment. In this environment, when a certain user speaks, sound is inputted through a microphone. The camera is continuously photographing images.

The information generated and inputted to the sound/image-integration processing unit 131 by the sound-event detecting unit 122 and the image-event detecting unit 112 is basically the same information and includes two kinds of information shown in FIG. 3B, i.e., (a) user position information and (b) user identification information (face identification information or speaker identification information). These two kinds of information are generated every time an event occurs. When sound information is inputted from the sound input units (the microphones) 121a to 121d, the sound-event detecting unit 122 generates (a) user position information and (b) user identification information on the basis of the sound information and inputs the information to the sound/image-integration processing unit 131. The image-event detecting unit 112 generates, for example, at a fixed frame interval set in advance, (a) user position information and (b) user identification information on the basis of image information inputted from the image input unit (the camera) 111 and inputs the information to the sound/image-integration processing unit 131. In this example, one camera is set as the image input unit (the camera) 111. Images of plural users are photographed by the one camera. In this case, the image-event detecting unit 112 generates (a) user position information and (b) user identification information for respective plural faces included in one image and inputs the information to the sound/image-integration processing unit 131.

Processing by the sound-event detecting unit 122 for generating (a) user position information and (b) user identification information (speaker identification information) on the basis of sound information inputted from the sound input units (the microphones) 121a to 121d is explained.

Processing for generating (a) user position information by the sound-event detecting unit 122

The sound-event detecting unit 122 generates, on the basis of sound information inputted from the sound input units (the microphones) 121a to 121d, estimation information concerning a position of a user who utters an analyzed voice, i.e., a speaker. In other words, the sound-event detecting unit 122 generates positions where the speaker is estimated to be present as Gaussian distribution (normal distribution) data N($m_e$, $\sigma_e$) including an expected value (average) [$m_e$] and variance information [$\sigma_e$].

Processing for generating (b) user identification information (speaker identification information) by the sound-event detecting unit 122

The sound-event detecting unit 122 estimates who a speaker is on the basis of sound information inputted from the sound input units (the microphones) 121a to 121d by performing comparison processing of input sound and characteristic information of voices of the users 1 to k registered in advance. Specifically, the sound-event detecting unit 122 calculates probabilities that the speaker is the respective users 1 to k. Values calculated by the calculation are set as (b) user identification information (speaker identification information). For example, the sound-event detecting unit 122 generates data set with probabilities that the speaker is the respective users by performing processing for allocating a highest score to a user having a registered sound characteristic closest to a characteristic of the input sound and allocating a lowest score (e.g., 0) to a user having a sound characteristic most different from the characteristic of the input sound and sets the data as (b) user identification information (speaker identification information).

Processing by the image-event detecting unit 112 for generating (a) user position information and (b) user identification information (face identification information) on the basis of image information inputted from the image input unit (the camera) 111 is explained.

Processing for generating (a) user position information by the image-event detecting unit 112

The image-event detecting unit 112 generates estimation information concerning positions of faces for respective faces included in image information inputted from the image input unit (the camera) 111. In other words, the image-event detecting unit 112 generates positions where faces detected from an image are estimated to be present as Gaussian distribution (normal distribution) data N ($m_e$, $\sigma_e$) including an expected value (average) [$m_e$] and variance information [$\sigma_e$].

Processing for generating (b) user identification information (face identification information) by the image-event detecting unit 112

The image-event detecting unit 112 detects, on the basis of image information inputted from the image input unit (the camera) 111, faces included in the image information and estimates whose face the respective faces are by performing comparison processing of the input image information and characteristic information of faces of the users 1 to k registered in advance. Specifically, the image-event detecting unit 112 calculates probabilities that the extracted respective faces are the respective users 1 to k. Values calculated by the calculation are set as (b) user identification information (face identification information). For example, the image-event detecting unit 112 generates data set with probabilities that the faces are the respective users by performing processing for allocating a highest score to a user having a registered face characteristic closest to a characteristic of a face included in an input image and allocating a lowest score (e.g., 0) to a user having a face characteristic most different from the characteristic of the face included in the input image and sets the data as (b) user identification information (face identification information).

When plural faces are detected from a photographed image of the camera, the image-event detecting unit 112 generates (a) user position information and (b) user identification information (face identification information) according to the respective detected faces and inputs the information to the sound/image-integration processing unit 131.

In this example, one camera is used as the image input unit 111. However, photographed images of plural cameras may be used. In that case, the image-event detecting unit 112 generates (a) user position information and (b) user identification information (face identification information) for respective faces included in the respective photographed images of the respective cameras and inputs the information to the sound/image-integration processing unit 131.

Processing executed by the sound/image-integration processing unit 131 is explained. As described above, the sound/image integration processing unit 131 is sequentially inputted with the two kinds of information shown in FIG. 3B, i.e., (a) user position information and (b) user identification information (face identification information or speaker identification information) from the sound-event detecting unit 122 or the image-event detecting unit 112. As input timing for these kinds of information, various settings are possible. For example, in a possible setting, the sound-event detecting unit 122 generates and inputs the respective kinds of information (a) and (b) as sound event information when new sound is inputted and the image-event detecting unit 112 generates and inputs the respective kinds of information (a) and (b) as image event information in fixed frame period units.

Processing executed by the sound/image-integration processing unit 131 is explained with reference to FIGS. 4A to 4C and subsequent figures. The sound/image-integration processing unit 131 sets probability distribution data of hypotheses concerning position and identification information of users and updates the hypotheses on the basis of input information to thereby perform processing for leaving only more likely hypotheses. As a method of this processing, the sound/image-integration processing unit 131 executes processing to which a particle filter is applied.

The processing to which the particle filter is applied is processing for setting a large number of particles corresponding to various hypotheses, in this example, hypotheses concerning positions and identities of users and increasing weights of more likely particles on the basis of the two kinds of information shown in FIG. 3B, i.e., (a) user position information and (b) user identification information (face identification information or speaker identification information) inputted from the sound-event detecting unit 122 or the image-event detecting unit 112.

An example of basic processing to which the particle filter is applied is explained with reference to FIGS. 4A to 4C. For example, the example shown in FIGS. 4A to 4C indicates an example of processing for estimating a presence position corresponding to a certain user using the particle filter. The example shown in FIGS. 4A to 4C is processing for estimating a position where a user 301 is present in a one-dimensional area on a certain straight line.

An initial hypothesis (H) is uniform particle distribution data as shown in FIG. 4A. Then, image data 302 is acquired and presence probability distribution data of the user 301 based on an acquired image is acquired as data shown in FIG. 4B. The particle distribution data shown in FIG. 4A is updated on the basis of the probability distribution data based on the acquired image. Updated hypothesis probability distribution data shown in FIG. 4C is obtained. Such processing is repeatedly executed on the basis of input information to obtain more likely position information of the user.

Details of the processing performed by using the particle filter are described in, for example, [D. Schulz, D. Fox, and J. Hightower, People Tracking with Anonymous and ID-sensors Using Rao-Blackwellised Particle Filters, Proc. of the International Joint Conference on Artificial Intelligence (IJCAI-03)].

The processing example shown in FIGS. 4A to 4C is explained as a processing example in which input information is only image data only for a presence position of the user 301. Respective particles have information concerning only the presence position of the user 301.

On the other hand, the processing according to this embodiment is processing for discriminating positions of plural users and who the plural users are on the basis of the two kinds of information shown in FIG. 3B, i.e., (a) user position information and (b) user identification information (face identification information or speaker identification information) inputted from the sound-event detecting unit 122 or the image-event detecting unit 112. Therefore, in the processing to which the particle filter is applied in this embodiment, the sound/image-integration processing unit 131 sets a large number of particles corresponding to hypotheses concerning positions of users and who the users are and updates particles on the basis of the two kinds of information shown in FIG. 3B inputted from the sound-event detecting unit 122 or the image-event detecting unit 112.

The structure of particles set in this processing example is explained with reference to FIG. 5. The sound/image-integration processing unit 131 has m (a number set in advance) particles, i.e., particles 1 to m shown in FIG. 5. Particle IDs (PID=1 to m) as identifiers are set for the respective particles.

Plural targets corresponding to virtual objects corresponding to positions and objects to be identified are set for the respective particles. In this example, for example, plural targets corresponding to virtual users equal to or lager in number than a number estimated as being present in an actual space are set for the respective particles. In the respective m particles, data equivalent to the number of targets are held in target units. In the example shown in FIG. 5, n targets are included in one particle. The structure of target data of the respective targets included in the respective particles is shown in FIG. 6.

The respective target data included in the respective particles are explained with reference to FIG. 6. FIG. 6 is the structure of target data of one target (target ID: tID=n) 311 included in the particle 1 (pID=1) shown in FIG. 5. The target data of the target 311 includes the following data as shown in FIG. 6:

(a) a probability distribution [Gaussian distribution: $N(m_{1n}, \sigma_{1n})$] of presence positions corresponding to the respective targets; and (b) user confidence factor information (uID) indicating who the respective targets are, i.e., $uID_{1n1}=0.0$, $uID_{1n2}=0.1$, ... and $uID_{1nk}=0.5$.

(1n) of $[m_{1n}, \sigma_{1n}]$ in the Gaussian distribution $N(m_{1n}, \sigma_{1n})$ described in (a) means a Gaussian distribution as a presence probability distribution corresponding to a target ID: tID=n in a particle ID: pID=1.

(1n1) included in $[uID_{1n1}]$ in the user confidence factor information (uID) described in (b) means a probability that a user with a target ID: tID=n in a particle ID: pID=1 is a user 1. In other words, data with a target ID=n means that a probability that the user is a user 1 is 0.0, a probability that the user is a user 2 is 0.1, ... and a probability that the user is a user k is 0.5.

Referring back to FIG. 5, the explanation about the particles set by the sound/image-integration processing unit 131 is continued. As shown in FIG. 5, the sound/image-integration processing unit 131 sets m (the number set in advance) particles (PID=1 to m). The respective particles have, for respective targets (tID=1 to n) estimated as being present in the actual space, target data of (a) a probability distribution [Gaussian distribution: $N(m, \sigma)$] of presence positions corresponding to the respective targets; and (b) user confidence factor information (uID) indicating who the respective targets are.

The sound/image-integration processing unit 131 is inputted with the event information shown in FIG. 3B, i.e., (a) user position information and (b) user identification information (face identification information or speaker identification information) from the sound-event detecting unit 122 or the image-event detecting unit 112 and performs processing for updating the m particles (PID=1 to m).

The sound/image-integration processing unit 131 executes the processing for updating the particles, generates (a) target information as estimation information indicating where plural users are present, respectively, and who the users are and (b) signal information indicating an event occurrence source such as a user who spoke, and outputs the information to the processing determining unit 132.

Figure 5:
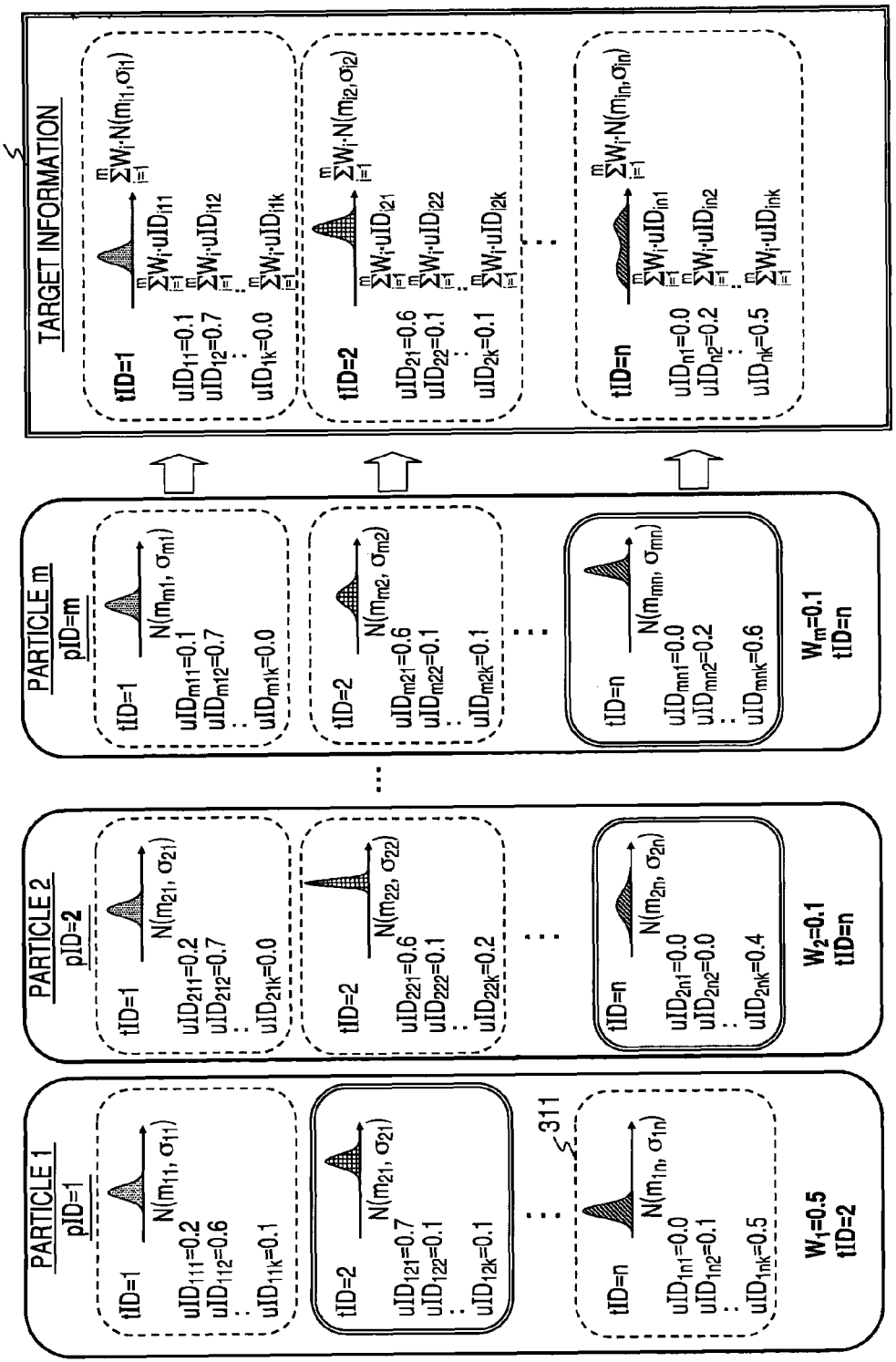
FIG. 5 is a diagram for explaining the structure of particles set in the processing example.
Figure 6:
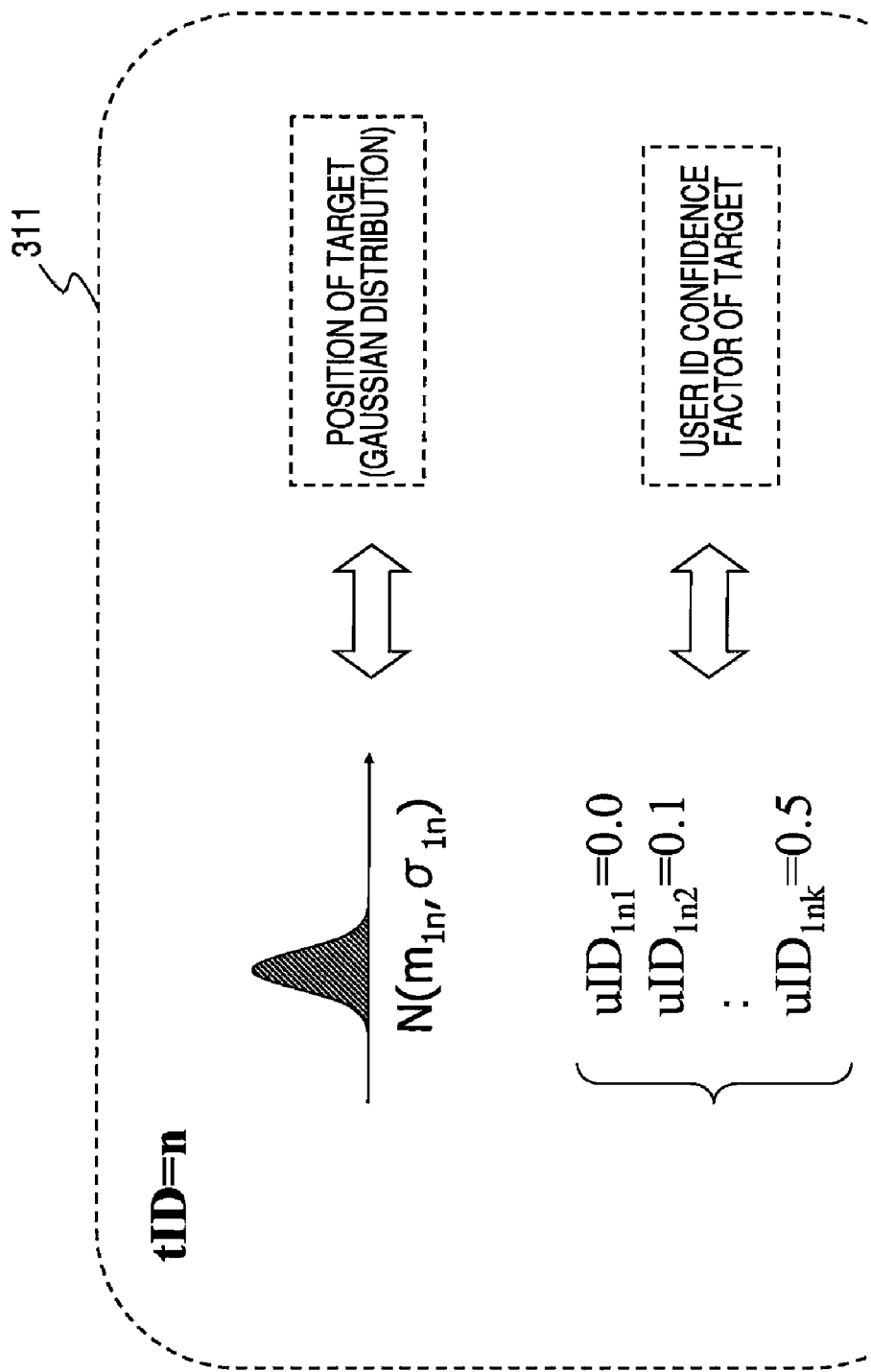
FIG. 6 is a diagram for explaining the structure of target data of respective targets included in the respective particles.

As shown in target information 305 at a right end in FIG. 5, the target information is generated as weighted sum data of data corresponding to the respective targets (tID=1 to n) included in the respective particles (PID=1 to m). Weights of the respective particles are described later.

The target information 305 is information indicating (a) presence positions of targets (tID=1 to n) corresponding to virtual users set in advance by the sound/image-integration processing unit 131 and (b) who the targets are (which one of uID1 to uIDk the targets are). The target information is sequentially updated according to update of the particles. For example, when the users 1 to k do not move in the actual environment, the respective users 1 to k converge as data corresponding to k targets selected out of the n targets (tID=1 to n).

For example, user confidence factor information (uID) included in data of a target 1 (tID=1) at the top in the target information 305 shown in FIG. 5 has a highest probability concerning the user 2 ($uID_{12}$=0.7). Therefore, the data of the target 1 (tID=1) is estimated as corresponding to the user 2. (12) in ($uID_{12}$) in the data [$uID_{12}$=0.7] indicating the user confidence factor information (uID) indicates a probability corresponding to the user confidence factor information (uID) of the user 2 with the target ID=1.

The data of the target 1 (tID=1) at the top in the target information 305 corresponds to the user 2 with a highest probability. A presence position of the user 2 is estimated as being within a range indicated by presence probability distribution data included in the data of the target 1 (tID=1) at the top in the target information 305.

In this way, the target information 305 indicates, concerning the respective targets (tID=1 to n) initially set as virtual objects (virtual users), respective kinds of information of (a) presence positions of the targets and (b) who the targets are (which one of uID1 to UIDk the targets are). Therefore, respective k pieces of target information of the respective targets (tID=1 to n) converge to correspond to the users 1 to k when the users do not move.

When the number of targets (tID=1 to n) is larger than the number of users k, there are targets that correspond to no user. For example, in a target (tID=n) at the bottom in the target information 305, the user confidence factor information (uID) is 0.5 at the maximum and the presence probability distribution data does not have a large peak. Such data is judged as not data corresponding to a specific user. Processing for deleting such a target may be performed. The processing for deleting a target is described later.

As explained above, the sound/image-integration processing unit 131 executes the processing for updating the particles on the basis of input information, generates (a) target information as estimation information indicating where plural users are present, respectively, and who the users are and (b) signal information indicating an event occurrence source such as a user who spoke, and outputs the information to the processing determining unit 132.

The target information is the information explained with reference to the target information 305 shown in FIG. 5. Besides the target information, the sound/image-integration processing unit 131 generates signal information indicating an event occurrence source such as a user who spoke and outputs the signal information. The signal information indicating the event occurrence source is, concerning a sound event, data indicating who spoke, i.e., a speaker and, concerning an image event, data indicating whose face a face included in an image is. In this example, as a result, the signal information in the case of the image event coincides with signal information obtained from the user confidence factor information (uID) of the target information.

As described above, the sound/image-integration processing unit 131 is inputted with the event information shown in FIG. 3B, i.e., user position information and user identification information (face identification information or speaker identification information) from the sound-event detecting unit 122 or the image-event detecting unit 112, generates (a) target information as estimation information indicating where plural users are present, respectively, and who the users are and (b) signal information indicating an event occurrence source such as a user who spoke, and outputs the information to the processing determining unit 132. This processing is explained below with reference to FIG. 7 and subsequent figures.

Figure 7:
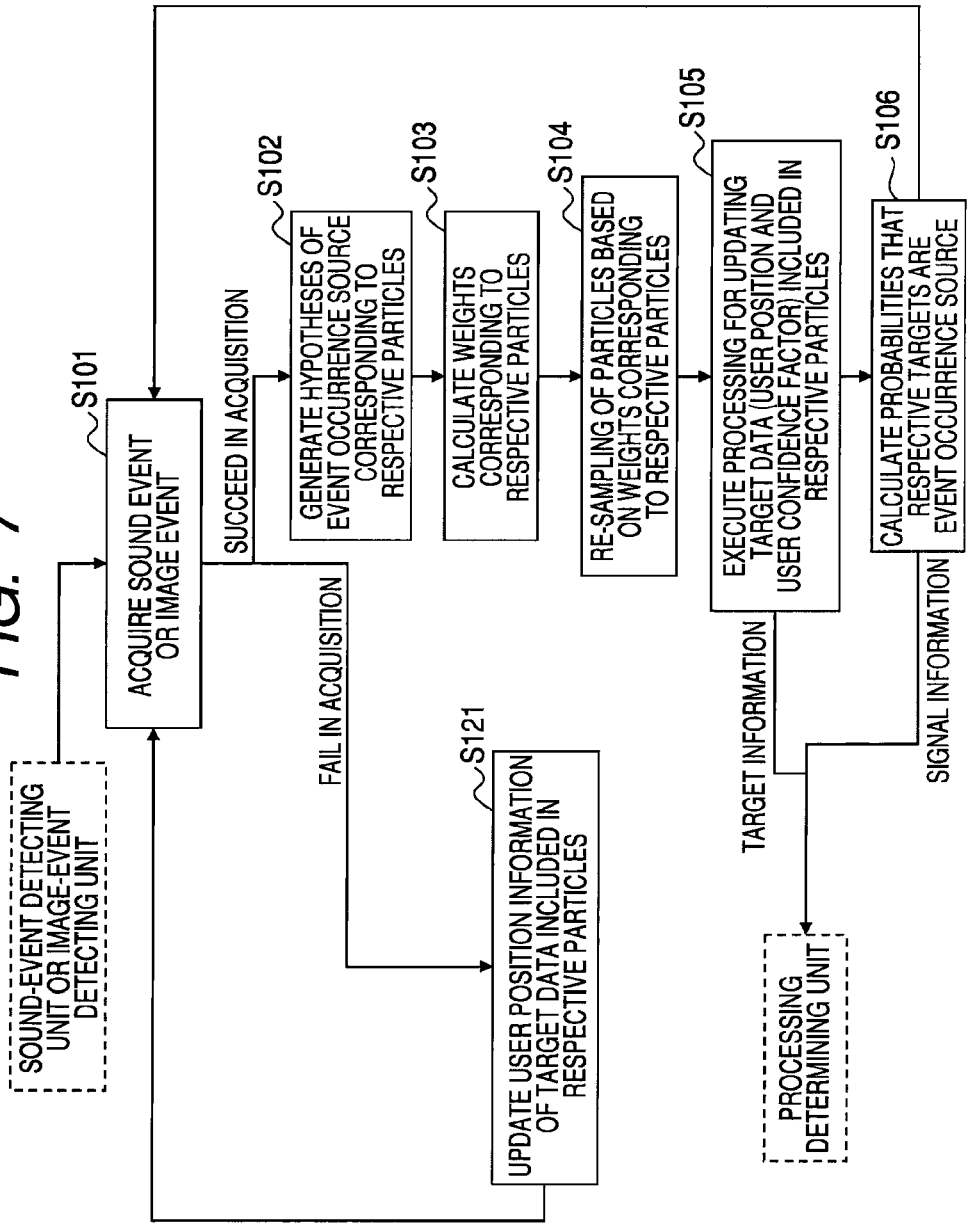
FIG. 7 is a flowchart for explaining a processing sequence executed by the sound/image-integration processing unit 131.

FIG. 7 is a flowchart for explaining a processing sequence executed by the sound/image-integration processing unit 131. First, in step S101, the sound/image-integration processing unit 131 is inputted with the event information shown in FIG. 3B, i.e., user position information and user identification information (face identification information or speaker identification information) from the sound-event detecting unit 122 or the image-event detecting unit 112.

When succeeding in acquisition of the event information, the sound/image-integration processing unit 131 proceeds to step S102. When failing in acquisition of the event information, the sound/image-integration processing unit 131 proceeds to step S121. Processing in step S121 is explained later.

When succeeding in acquisition of the event information, the sound/image-integration processing unit 131 performs particle update processing based on the input information in step S102 and subsequent steps. Before the particle update processing, in step S102, the sound/image-integration processing unit 131 sets hypotheses of an event occurrence source in the respective m particles (pID=1 to m) shown in FIG. 5. The event occurrence source is, for example, in the case of a sound event, a user who spoke and, in the case of an image event, a user who has an extracted face.

In the example shown in FIG. 5, hypothesis data (tID=xx) of an event occurrence source is shown at the bottom of the respective particles. In the example shown in FIG. 5, hypotheses indicating which of the targets 1 to n the event occurrence source is are set for the respective particles in such a manner as tID=2 for the particle 1 (pID=1), tID=n for the particle 2 (pID2), ..., and tID=n for the particle m (pID=m). In the example shown in FIG. 5, target data of the event occurrence source set as the hypotheses are surrounded by double lines and indicated for the respective particles.

The setting of hypotheses of an event occurrence source is executed every time the particle update processing based on an input event is performed. In other words, the sound/image-integration processing unit 131 sets hypotheses of an event occurrence source for the respective particles 1 to m. Under the hypotheses, the sound/image-integration processing unit 131 is inputted with the event information shown in FIG. 3B, i.e., (a) user position information and (b) user identification information (face identification information or speaker identification information) as an event from the sound-event detecting unit 122 or the image-event detecting unit 112 and performs processing for updating the m particles (PID=1 to m)

When the Particle Update Processing is Performed, the hypotheses of an event occurrence source set for the respective particles 1 to m are reset and new hypotheses are set for the respective particles 1 to m. As a form of setting hypotheses, it is possible to adopt any one of methods of (1) random setting and (2) setting according to an internal model of the sound/image-integration processing unit 131. The number of particles m is set larger than the number n of targets. Therefore, plural particles are set in hypotheses in which an identical target is an event occurrence source. For example, when the number of targets n is 10, for example, processing with the number of particles m set to about 100 to 1000 is performed.

A specific processing example of the processing for (2) setting hypotheses according to an internal model of the sound/image-integration processing unit 131 is explained.

First, the sound/image-integration processing unit 131 calculates weights [$W_{tID}$] of the respective targets by comparing the event information acquired from the sound-event detecting unit 122 or the image-event detecting unit 112, i.e., the two kinds of information shown in FIG. 3B, i.e., (a) user position information and (b) user identification information (face identification information or speaker identification information) and data of targets included in particles held by the sound/image-integration processing unit 131. The sound/image-integration processing unit 131 sets hypotheses of an event occurrence source for the respective particles (pID=1 to m) on the basis of the calculated weights [$W_{tID}$] of the respective targets. The specific processing example is explained below.

In an initial state, hypotheses of an event occurrence source set for the respective particles (pID=1 to m) are set equal. In other words, when m particles (pID=1 to m) having the n targets (tID=1 to n) are set, initial hypothesis targets (tID=1 to n) of an event occurrence source set for the respective particles (pID=1 to m) are set to be equally allocated in such a manner that m/n particles are particles having the target 1 (tID=1) as an event occurrence source, m/n particles are particles having the target 2 (tID=2) as an event occurrence source, . . . , and m/n particles are particles having the target n (tID=n) as an event occurrence source.

In step S101 shown in FIG. 7, the sound/image-integration processing unit 131 acquires the event information, i.e., the two kinds of information shown in FIG. 3B, i.e., (a) user position information and (b) user identification information (face identification information or speaker identification information) from the sound-event detecting unit 122 or the image-event detecting unit 112. When succeeding in acquisition of the event information, in step S102, the sound/image-integration processing unit 131 sets hypothesis targets (tID=1 to n) of an event occurrence source for the respective m particles (PID=1 to m).

Details of the setting of hypothesis target corresponding to the particles in step S102 are explained. First, the sound/image-integration processing unit 131 compares the event information inputted in step S101 and the data of the targets included in the particles held by the sound/image-integration processing unit 131 and calculates target weights [$W_{tID}$] of the respective targets using a result of the comparison.

Details of the processing for calculating target weights [$W_{tID}$] are explained with reference to FIG. 8. The calculation of target weights is executed as processing for calculating n target weights corresponding to the respective targets 1 to n set for the respective particles as shown at a right end in FIG. 8. In calculating the n target weights, first, the sound/image-integration processing unit 131 calculates likelihoods as indication values of similarities between input event information shown in (1) in FIG. 8, i.e., the event information inputted to the sound/image-integration processing unit 131 from the sound-event detecting unit 122 or the image-event detecting unit 112 and respective target data of the respective particles.

Figure 8:
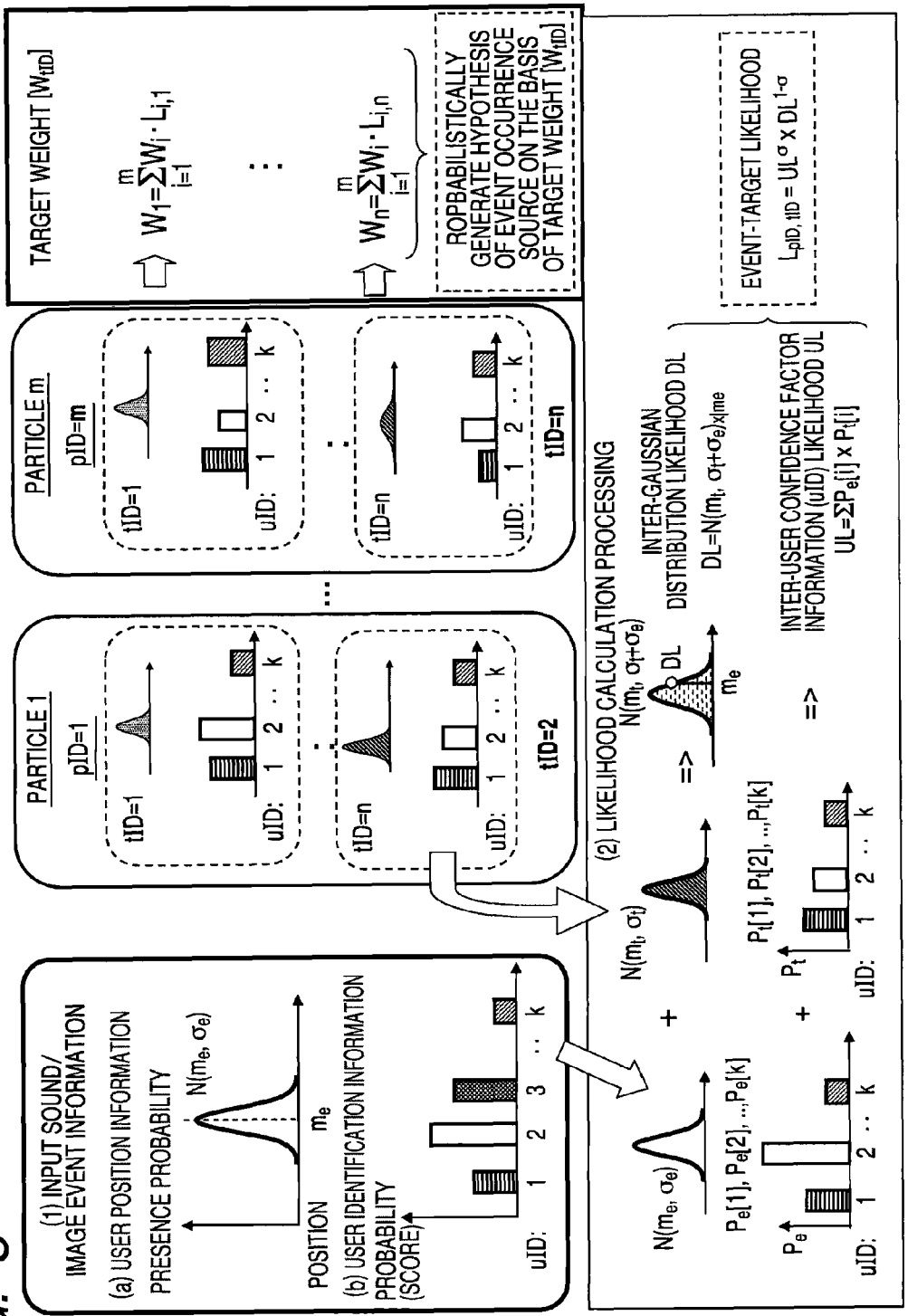
FIG. 8 is a diagram for explaining details of processing for calculating a target weight [$W_{tID}$]

An example of likelihood calculation processing shown in (2) in FIG. 8 is an example of calculation of an event-target likelihood by comparison of the input event information (1) and one target data (tID=n) of the particle 1. In FIG. 8, an example of comparison with one target data is shown. However, the same likelihood calculation processing is executed on the respective target data of the respective particles.

The likelihood calculation processing (2) shown at the bottom of FIG. 8 is explained. As shown in (2) in FIG. 8, as the likelihood calculation processing, first, the sound/image-integration processing unit 131 individually calculates (a) an inter-Gaussian distribution likelihood [DL] as similarity data between an event concerning user position information and target data and (b) an inter-user confidence factor information (uID) likelihood [UL] as similarity data between an event concerning user identification information (face identification information or speaker identification information) and the target data.

First, processing for calculating (a) the inter-Gaussian distribution likelihood [DL] as similarity data between an event concerning user position information and target data is explained.

A Gaussian distribution corresponding to user position information in the input event information shown in (1) in FIG. 8 is represented as N($m_e$, $\sigma_e$). A Gaussian distribution corresponding to user position information of a certain target included in a certain particle of the internal model held by the sound/image-integration processing unit 131 is represented as N ($m_t$, $\sigma_t$). In the example shown in FIG. 8, a Gaussian distribution included in target data of the target n (tID=n) of the particle 1 (pID=1) is represented as N($m_t$, $\sigma_t$).

An inter-Gaussian distribution likelihood [DL] as an index for judging a similarity between the Gaussian distributions of these two data is calculated by the following equation:

$$DL = N(m_t, \sigma_t + \sigma_e) x | m_e$$

The equation is an equation for calculating a value of a position of x=$m_e$ in a Gaussian distribution with a variance $\sigma_t + \sigma_e$ in the center $m_t$.

Processing for calculating (b) the inter-user confidence factor information (uID) likelihood [UL] as similarity data between an event concerning user identification information (face identification information or speaker identification information) and the target data is explained.

Values (scores) of confidence factors of the respective users 1 to k of the user confidence factor information (uID) in the input event information shown in (1) in FIG. 8 are represented as $P_e[i]$. "i" is a variable corresponding to user identifiers 1 to k. Values (scores) of confidence factors of the respective users 1 to k of user confidence factor information (uID) of a certain target included in a certain particle of the internal model held by the sound/image-integration processing unit 131 are represented as $P_t[i]$ In the example shown in FIG. 8, values (scores) of confidence factors of the respective users 1 to k of the user confidence factor information (uID) included in the target data of the target n (tID=n) of the particle 1 (pID=1) are represented as $P_t[i]$.

An inter-user confidence factor information (uID) likelihood [UL] as an index for judging a similarity between the user confidence factor information (uID) of these two data is calculated by the following equation:

$$UL = \Sigma P_e[i] \times P_t[i]$$

The equation is an equation for calculating a sum of products of values (scores) of confidence factors of respective corresponding users included in the user confidence factor information (uID) of the two data. A value of the sum is the inter-user confidence factor information (uID) likelihood [UL].

Alternatively, it is also possible that a maximum of the respective products, i.e., a value $UL = \arg\max(P_e[i] \times P_t[i])$ is calculated as the inter-user confidence factor information (uID) likelihood [UL] and this value is used as the inter-user confidence factor information (uID) likelihood [UL].

An event-target likelihood $[L_{pID, tID}]$ as an index of a similarity between the input event information and one target (tID) included in a certain particle (pID) is calculated by using the two likelihoods, i.e., the inter-Gaussian distribution likelihood [DL] and the inter-user confidence factor information (uID) likelihood [UL]. In other words, the event-target likelihood $[L_{pID, tID}]$ is calculated by the following equation by using a weight $\alpha$ ($\alpha = 0$ to 1):

$$[L_{pID, tID}] = UL^{\alpha} \times DL^{1-\alpha}$$

where, $\alpha$ is 0 to 1.

The event-target likelihood $[L_{pID, tID}]$ is calculated for the respective targets of the respective particles. Target weights $[W_{tID}]$ of the respective targets are calculated on the basis of the event-target likelihood $[L_{pID, tID}]$.

The weight $[\alpha]$ applied to the calculation of the event-target likelihood $[L_{pID, tID}]$ may be a value fixed in advance or may be set to be changed according to an input event. It is also possible that, for example, in the case in which the input event is an image, for example, when face detection is successful and position information can be acquired but face identification is failed, $\alpha$ is set to 0, the inter-user confidence factor information (uID) likelihood [UL] is set to 1, the event-target likelihood $[L_{pID, tID}]$ is calculated depending only on the inter-Gaussian likelihood [DL], and a target weight $[W_{tID}]$ depending only on the inter-Gaussian likelihood [DL] is calculated.

It is also possible that, for example, in the case in which the input event is sound, for example, when speaker identification is successful and speaker information can be acquired but acquisition of position information is failed, $\alpha$ is set to 0, the inter-Gaussian distribution likelihood [DL] is set to 1, the event-target likelihood $[L_{pID, tID}]$ is calculated depending only on the inter-user confidence factor information (uID) likelihood [UL], and the target weight $[W_{tID}]$ depending only on the inter-user confidence factor information (uID) likelihood [UL] is calculated.

A formula for calculating the target weight $[W_{tID}]$ based on the event-target likelihood $[L_{pID, tID}]$ is as follows:

$$W_{tID} = \sum_{pID}^{m} W_{pID} L_{pID, tID}$$

In the formula, $[W_{pID}]$ is a particle weight set for the respective particles. Processing for calculating the particle weight $[W_{pID}]$ is explained later. In an initial state, as the particle weight $[W_{pID}]$, a uniform value is set for all the particles (pID=1 to m).

The processing in step S101 in the flow shown in FIG. 7, i.e., the generation of event occurrence source hypotheses corresponding to the respective particles is executed on the basis of the target weight $[W_{tID}]$ calculated on the basis of the event-target likelihood $[L_{pID, tID}]$. As the target weight $[W_{tID}]$, n data corresponding to the target 1 to n (tID=1 to n) set for the particles are calculated.

Event occurrence source hypothesis targets corresponding to the respective m particles (pID=1 to m) are set to be allocated according to a ratio of the target weight $[W_{tID}]$.

For example, when n is 4 and the target weight $[W_{tID}]$ calculated according to the targets 1 to 4 (tID=1 to 4) is as follows:
    the target 1: target weight=3;
    the target 2: target weight=2;
    the target 3: target weight=1; and
    the target 4: target weight=5,
the event occurrence source hypothesis targets of the m particles are set as follows:
    30% in the m particles is an event occurrence source hypothesis target 1;
    20% in the m particles is an event occurrence source hypothesis target 2;
    10% in the m particles is an event occurrence source hypothesis target 3; and
    50% in the m particles is an event occurrence source hypothesis target 4.

In other words, event occurrence source hypothesis targets set for the particles are distributed according to a ratio of weights of the targets.

After setting the hypotheses, the sound/image-integration processing unit 131 proceeds to step S103 of the flow shown in FIG. 7. In step S103, the sound/image-integration processing unit 131 calculates weighs corresponding to the respective particles, i.e., particle weights $[W_{pID}]$. As the particle weights $[W_{pID}]$, as described above, a uniform value is initially set for the respective particles but is updated according to an event input.

Details of processing for calculating a particle weight $[W_{pID}]$ are explained with reference to FIGS. 9 and 10. The particle weight $[W_{pID}]$ are equivalent to an index for judging correctness of hypotheses of the respective particles for which hypothesis targets of an event occurrence source are generated. The particle weight $[W_{pID}]$ is calculated as an event-target likelihood that is a similarity between the hypothesis targets of an event occurrence source set for the respective m particles (pID=1 to m) and an input event.

Figure 9:
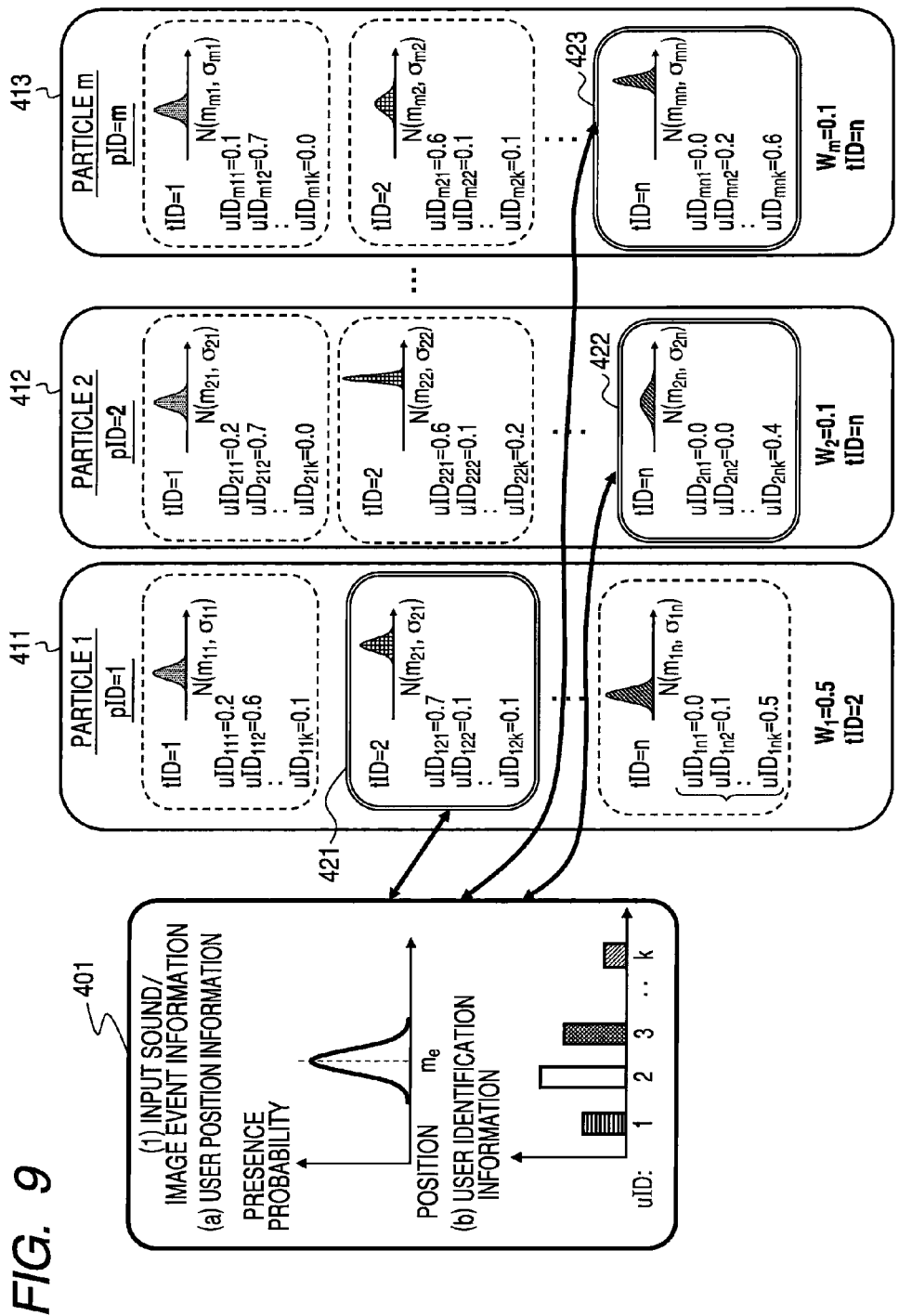
FIG. 9 is a diagram for explaining details of processing for calculating a particle weight [$W_{pID}$]

In FIG. 9, event information 401 inputted to the sound/image-integration processing unit 131 from the sound-event detecting unit 122 or the image-event detecting unit 112 and particles 411 to 413 held by the sound/image-integration processing unit 131 are shown. In the respective particles 411 to 413, the hypothesis targets set in the processing described above, i.e., the setting of hypotheses of an event occurrence source in step S102 of the flow shown in FIG. 7 are set. In an example shown in FIG. 9, as the hypothesis targets, targets are set as follows:
    a target 2 (tID=2) 421 for the particle 1 (pID=1) 411;
    a target n (tID=n) 422 for the particle 2 (pID=2) 412; and
    a target n (tID=n) 423 for the particle m (pID=m) 413.

In the example shown in FIG. 9, the particle weights $[W_{pID}]$ of the respective particles correspond to event-target likelihoods as follows:
    the particle 1: an event-target likelihood between the event information 401 and the target 2 (tID=2) 421;
    the particle 2: an event-target likelihood between the event information 401 and the target n (tID=n) 422; and the particle m: an event-target likelihood between the event information 401 and the target n (tID=n) 423.

Figure 10:
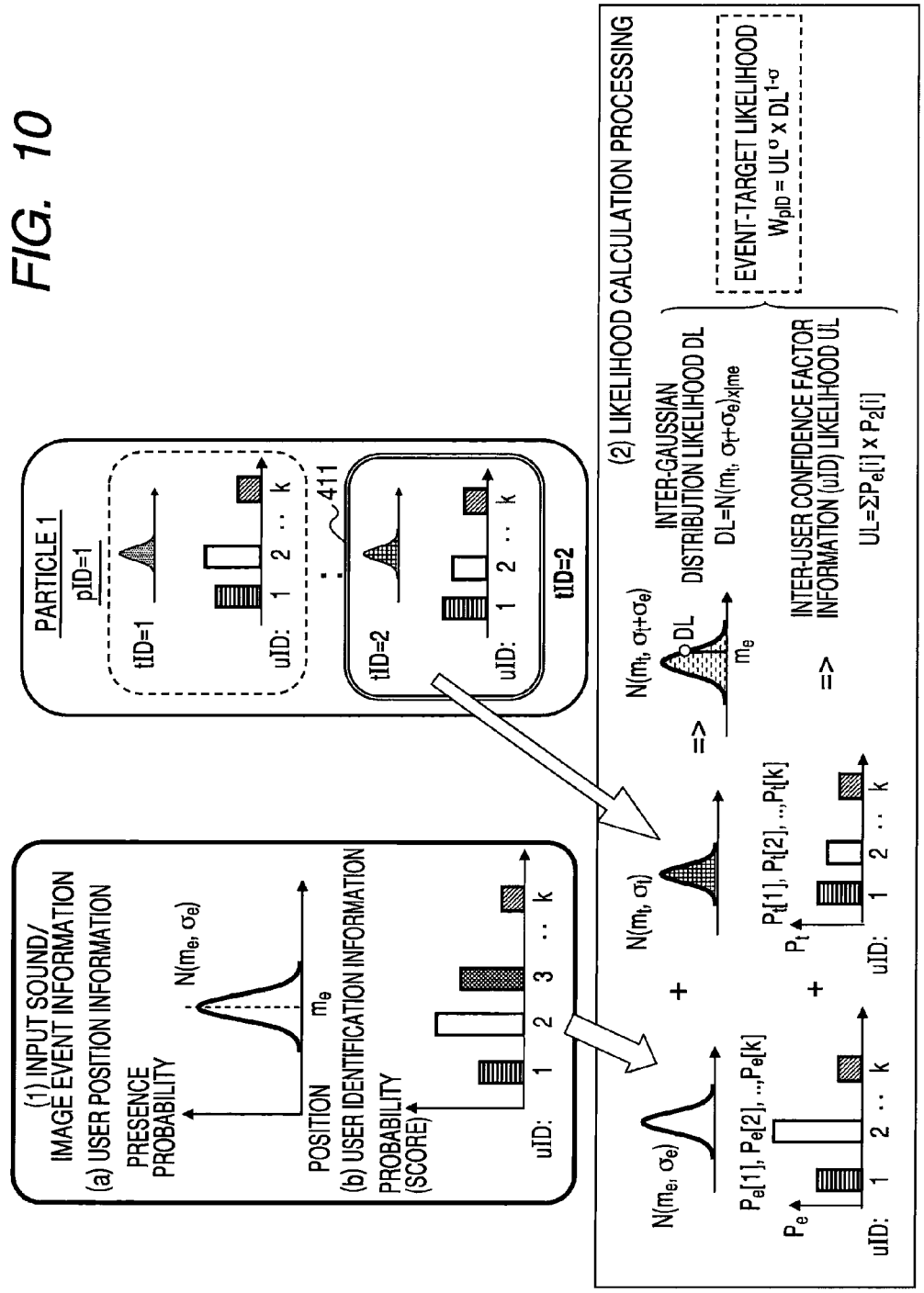
FIG. 10 is a diagram for explaining details of processing for calculating the particle weight [$W_{pID}$]

FIG. 10 shows an example of processing for calculating the particle weight [$W_{pID}$] for the particle 1 (pID-1). Processing for calculating the particle weight [$W_{pID}$] shown in (2) in FIG. 10 is likelihood calculation processing same as that explained with reference to (2) in FIG. 8. In this example, the processing is executed as Calculation of an event-target likelihood as an index of a similarity between (1) the input event information and an only hypothesis target selected out of the particles.

(2) Likelihood calculation processing shown at the bottom of FIG. 10 is, like that explained with reference to (2) in FIG. 8, processing for individually calculating (a) an inter-Gaussian distribution likelihood [DL] as similarity data between an event concerning user position information and target data and (b) an inter-user confidence factor information (uID) likelihood [UL] as similarity data between an event concerning user identification information (face identification information or speaker identification information) and the target data.

Processing for calculating (a) the inter-Gaussian distribution likelihood [DL] as similarity data between an event concerning user position information and a hypothesis target is processing described below.

A Gaussian distribution corresponding to user position information in input event information is represented as N($m_e$, $\sigma_e$) and a Gaussian distribution corresponding to user position information of a hypothesis target selected out of the particles is represented as N($m_t$, $\sigma_t$). The inter-Gaussian distribution likelihood [DL] is calculated by the following equation:

$$DL = N(m_t, \sigma_t + \sigma_e) x | m_e$$

The equation is an equation for calculating a value of a position of x=$m_e$ in a Gaussian distribution with distribution $\sigma_t+\sigma_e$ in the center $m_t$.

Processing for calculating (b) the inter-user confidence factor information (uID) likelihood [UL] as similarity data between an event concerning user identification information (face identification information or speaker identification information) and a hypothesis target is processing described below.

Values (scores) of confidence factors of the respective users 1 to k of the user confidence factor information (uID) in the input event information are represented as Pe[i] "i" is a variable corresponding to user identifiers 1 to k.

Values (scores) of confidence factors of the respective users 1 to k of user confidence factor information (uID) of a hypothesis target selected out of the particles are represented as Pt[i]. An inter-user confidence factor information (uID) likelihood [UL] is calculated by the following equation:

$$UL = \Sigma P_e[i] \times P_t[i]$$

The equation is an equation for calculating a sum of products of values (scores) of confidence factors of respective corresponding users included in the user confidence factor information (uID) of the two data. A value of the sum is the inter-user confidence factor information (uID) likelihood [UL].

The particle weight [$W_{pID}$] is calculated by using the two likelihoods, i.e., the inter-Gaussian distribution likelihood [DL] and the inter-user confidence factor information (uID) likelihood [UL]. In other words, the particle weight [$W_{pID}$] is calculated by the following equation by using a weight a ($\alpha$=0 to 1):

$$[W_{pID}] = UL^{\alpha} \times DL^{1-\alpha}$$

where, $\alpha$ is 0 to 1.

The particle weight [$W_{pID}$] is calculated for the respective targets of the respective particles.

As in the processing for calculating the event-target likelihood [$L_{pID, tID}$] described above, the weight [$\alpha$] applied to the calculation of the particle weight [$W_{pID}$] may be a value fixed in advance or may be set to be changed according to an input event. It is also possible that, for example, in the case in which the input event is an image, for example, when face detection is successful and position information can be acquired but face identification is failed, $\alpha$ is set to 0, the inter-user confidence factor information (uID) likelihood [UL] is set to 1, and the particle weight [$W_{pID}$] is calculated depending only on the inter-Gaussian likelihood [DL]. It is also possible that, for example, in the case in which the input event is sound, for example, when speaker identification is successful and speaker information can be acquired but acquisition of position information is failed, $\alpha$ is set to 0, the inter-Gaussian distribution likelihood [DL] is set to 1, and the particle weight [$W_{pID}$] is calculated depending only on the inter-user confidence factor information (uID) likelihood [UL].

The calculation of the particle weight [$W_{pID}$] corresponding to the respective particles in step S103 in the flow in FIG. 7 is executed as the processing explained with reference to FIGS. 9 and 10 in this way. Subsequently, in step S104, the sound/image-integration processing unit 131 executes processing for re-sampling particles on the basis of the particle weights [$W_{pID}$] of the respective particles set in step S103.

The particle re-sampling processing is executed as processing for selecting particles out of the m particles according to the particle weight [$W_{pID}$]. Specifically, when the number of particles m is 5, particle weights are set as follows:
    the particle 1: the particle weight [$W_{pID}$]=0.40;
    the particle 2: the particle weight [$W_{pID}$]=0.10;
    the particle 3: the particle weight [$W_{pID}$]=0.25;
    the particle 4: the particle weight [$W_{pID}$]=0.05; and
    the particle 5: the particle weight [$W_{pID}$]=0.20.
In this case, the particle 1 is re-sampled at a probability of 40% and the particle 2 is re-sampled at a probability of 10%. Actually, m is as large as 100 to 1000. A result of the re-sampling includes particles at a distribution ratio corresponding to weights of the particles.

According to this processing, a large number of particles with large particle weights [$W_{pID}$] remain. Even after the re-sampling, the total number [m] of the particles is not changed. After the re-sampling, the weights [$W_{pID}$] of the respective particles are reset. The processing is repeated from step S101 according to an input of a new event.

In step S105, the sound/image-integration processing unit 131 executes processing for updating target data (user positions and user confidence actors) included in the respective particles. Respective targets include, as explained above with reference to FIG. 6 and the like, the following data:
    (a) user positions: a probability distribution of presence positions corresponding to the respective targets [Gaussian distribution: N($m_t$, $\sigma_t$)]; and
    (b) user confidence factors: values (scores) of probabilities that the respective targets are the respective users 1 to k as the user confidence factor information (uID) indicating who the respective targets are: Pt[i] (i=1 to k), i.e., $uID_{t1}$=Pt[1], $uID_{t2}$=Pt[2], . . . , and $uID_{tk}$=Pt[k].

The update of the target data in step S105 is executed for each of (a) user positions and (b) user confidence factors. First, processing for updating (a) user positions is explained.

The update of the user positions is executed as update processing at two stages, i.e., (a1) update processing applied to all the targets of all the particles and (a2) update processing applied to event occurrence source hypothesis targets set for the respective particles.

(a1) The update processing applied to all the targets of all the particles is executed on all of targets selected as event occurrence source hypothesis targets and the other targets. This processing is executed on the basis of an assumption that a variance of the user positions expands as time elapses. The user positions are updated by using a Kalman filter according to elapsed time from the last update processing and position information of an event.

An example of update processing in the case of one-dimensional position information is explained. First, the elapsed time from the last update processing is represented as [dt] and a predicted distribution of the user positions after dt for all the targets is calculated. In other words, an expected value (average) $[m_t]$ and a variance $[\sigma_t]$ of a Gaussian distribution $N(m_t, \sigma_t)$ as variance information of the user positions are updated as described below.

$$m_t = m_t + xc \times dt$$

$$\sigma_t^2 = \sigma_t^2 + \sigma c^2 \times dt$$

where, $m_t$ is a predicted expected value (predicted state), $\sigma_t^2$ is a predicted covariance (predicted estimate covariance), xc is movement information (control model), and $\sigma c^2$ is noise (process noise).

When performed under a condition that users do not move, the update processing can be performed with xc set to 0.

According to this calculation processing, the Gaussian distribution $N(m_t, \sigma_t)$ as the user position information included in all the targets is updated.

Concerning the targets as the hypotheses of an event occurrence source each set for the respective particles, update processing is executed by using a Gaussian distribution $N(m_e, \sigma_e)$ indicating user positions included in the event information inputted from the sound-event detecting unit 122 or the image-event detecting unit 112.

A Kalman gain is represented as K, an observed value (observed state) included in the input event information $N(m_e, \sigma_e)$ is represented as $m_e$, and an observed value (observed covariance) included in the input event information $N(m_e, \sigma_e)$ is represented as $\sigma_e^2$. Update processing is performed as described below.

$$K = \sigma_t^2 / (\sigma_t^2 + \sigma_e^2)$$

$$m_t = m_t + K(xc - m_t)$$

$$\sigma_t^2 = (1-K)\sigma_t^2$$

(b) The processing for updating user confidence factors executed as processing for updating target data is explained. The target data includes, besides the user position information, values (scores) of probabilities that the respective targets are the respective users 1 to k as user confidence factor information (uID) indicating who the respective targets are [Pt[i] (i=1 to k)]. In step S105, the sound/image-integration processing unit 131 also performs processing for updating the user confidence factor information (uID).

The update of the user confidence factor information (uID) of the targets included in the respective particles [Pt(i) (i=1 to k)] is performed by applying an update ratio [β] having a value in a range of 0 to 1 set in advance according to posterior probabilities for all registered users and the user confidence factor information (uID) included in the event information [Pe[i] (i=1 to k)] inputted from the sound-event detecting unit 122 or the image-event detecting unit 112.

The update of the user confidence factor information (uID) of the targets [Pt[i] (i=1 to k)] is executed according to the following equation:

$$PL[i] = (1-\beta) \times PL[i] + \beta \ast Pe[i]$$

where, i is 1 to k and B is 0 to 1.
The update ratio [β] is a value in a range of 0 to 1 and is set in advance.

In step S105, the sound/image-integration processing unit 131 generates target information on the basis of the following data included in the updated target data and the respective particle weights $[W_{pID}]$ and outputs the target information to the processing determining unit 132:

(a) user positions: a probability distribution of presence positions corresponding to the respective targets [Gaussian distribution: $N(m_t, \sigma_t)$]; and (b) user confidence factors: values (scores) of probabilities that the respective targets are the respective users 1 to k as the user confidence factor information (uID) indicating who the respective targets are: Pt[i] (i=1 to k), i.e., $uID_{t1} = Pt[1]$, $uID_{t2} = Pt[2]$, ..., and $uID_{tk} = Pt[k]$.

As explained with reference to FIG. 5, the target information is generated as weighted sum data of data corresponding to the respective targets (tID=1 to n) included in the respective particles (PID=1 to m). The target information is data shown in the target information 305 at the right end in FIG. 5. The target information is generated as information including (a) user position information and (b) user confidence factor information of the respective targets (tID=1 to n).

For example, user position information in target information corresponding to the target (tID=1) is represented by the following formula:

$$\sum_{i=1}^{m} W_i \cdot N(m_{i1}, \sigma_{i1})$$

In the formula, $W_i$ indicates the particle weight $[W_{pID}]$.

User confidence factor information in target information corresponding to the target (tID=1) is represented by the following formula:

$$\sum_{i=1}^{m} W_i \cdot uID_{i11}$$

$$\sum_{i=1}^{m} W_i \cdot uID_{i12}$$

$$\vdots$$

$$\sum_{i=1}^{m} W_i \cdot uID_{i1k}$$

In the formula, $W_i$ indicates the particle weight $[W_{pID}]$.

The sound/image-integration processing unit 131 calculates these kinds of target information for the respective n targets (tID=1 to n) and outputs the calculated target information to the processing determining unit 132.

Processing in step S106 shown in FIG. 7 is explained. In step S106, the sound/image-integration processing unit 131 calculates probabilities that the respective n targets (tID=1 ton) are event occurrence sources and outputs the probabilities to the processing determining unit 132 as signal information.

As explained above, the signal information indicating the event occurrence sources is, concerning a sound event, data indicating who spoke, i.e., a speaker and, concerning an image event, data indicating whose face a face included in an image is.

The sound/image-integration processing unit 131 calculates probabilities that the respective targets are event occurrence sources on the basis of the number of hypothesis targets of an event occurrence source set in the respective particles. In other words, probabilities that the respective targets (tID=1 to n) are event occurrence sources are represented as P(tID=i), where, "i" is 1 to n. In this case, probabilities that the respective targets are event occurrence sources are calculated as P(tID=1): the number of targets to which tID=1 is allocated/m, P(tID=2): the number of targets to which tID=2 is allocated/m, . . . , and P(tID=n): the number of targets to which tID=2 is allocated/m.

The sound/image-integration processing unit 131 outputs information generated by this calculation processing, i.e., the probabilities that the respective targets are event occurrence sources to the processing determining unit 132 as signal information.

When the processing in step S106 is finished, the sound/image-integration processing unit 131 returns to step S101 and shifts to a state of standby for an input of event information from the sound-event detecting unit 122 or the image-event detecting unit 112.

Steps S101 to S106 of the flow shown in FIG. 7 have been explained. Even when the sound/image-integration processing unit 131 may be unable to acquire the event information shown in FIG. 3B from the sound-event detecting unit 122 or the image-event detecting unit 112 in step S101, update of data of the targets included in the respective particles is executed in step S121. This update is processing that takes into account a change in user positions according to elapse of time.

This target update processing is processing same as (a1) the update processing applied to all the targets of all the particles in the explanation of step S105. This processing is executed on the basis of an assumption that a variance of the user positions expands as time elapses. The user positions are updated by using the Kalman filter according to elapsed time from the last update processing and position information of an event.

An example of update processing in the case of one-dimensional position information is explained. First, the elapsed time from the last update processing is represented as [dt] and a predicted distribution of the user positions after dt for all the targets is calculated. In other words, an expected value (average) [$m_t$] and a variance [$\sigma_t$] of a Gaussian distribution N($m_t$, $\sigma_t$) as variance information of the user positions are updated as described below.

$$m_t = m_t + xc \times dt$$

$$\sigma_t^2 = \sigma_t^2 + \sigma c^2 \times dt$$

where, $m_t$ is a predicted expected value (predicted state), $\sigma_t^2$ is a predicted covariance (predicted estimate covariance), xc is movement information (control model), and $\sigma c^2$ is noise (process noise).

When the calculation processing is performed under a condition that users do not move, the update processing can be performed with xc set to 0.

According to the calculation processing, the Gaussian distribution N($m_t$, $\sigma_t$) as the user position information included in all the targets is updated.

The user confidence factor information (uID) included in the targets of the respective particles is not updated unless posterior probabilities or scores [Pe] for all registered users of events can be acquired from event information.

When the processing in step S121 is finished, the sound/image-integration processing unit 131 returns to step S101 and shifts to the state of standby for an input of event information from the sound-event detecting unit 122 or the image-event detecting unit 112.

The processing executed by the sound/image-integration processing unit 131 has been explained with reference to FIG. 7. The sound/image-integration processing unit 131 repeatedly executes the processing according to the flow shown in FIG. 7 every time event information is inputted from the sound-event detecting unit 122 or the image-event detecting unit 112. By repeating the processing, weights of particles with targets having higher reliabilities set as hypothesis targets increase. By performing sampling processing based on the particle weights, particles having larger weights remain. As a result, data having high reliabilities similar to event information inputted from the sound-event detecting unit 122 or the image-event detecting unit 112 remain. Finally, information having high reliabilities, i.e., (a) target information as estimation information indicating whether plural users are present, respectively, and who the users are and (b) signal information indicating an event occurrence source such as a user who spoke is generated and outputted to the processing determining unit 132.

Generation and Deletion of a Target

In the explanation of the embodiment, the sound/image-integration processing unit 131 sets the n targets in the respective m particles in advance and performs processing. However, the number of targets may be set to be appropriately changed. In other words, generation of new targets and deletion of targets may be performed when necessary.

Generation of a Target

Processing for generating a new target in the sound/image-integration processing unit 131 is explained with reference to FIG. 11. The generation of a new target is performed, for example, when event occurrence source hypotheses are set for the respective particles.

Figure 11:
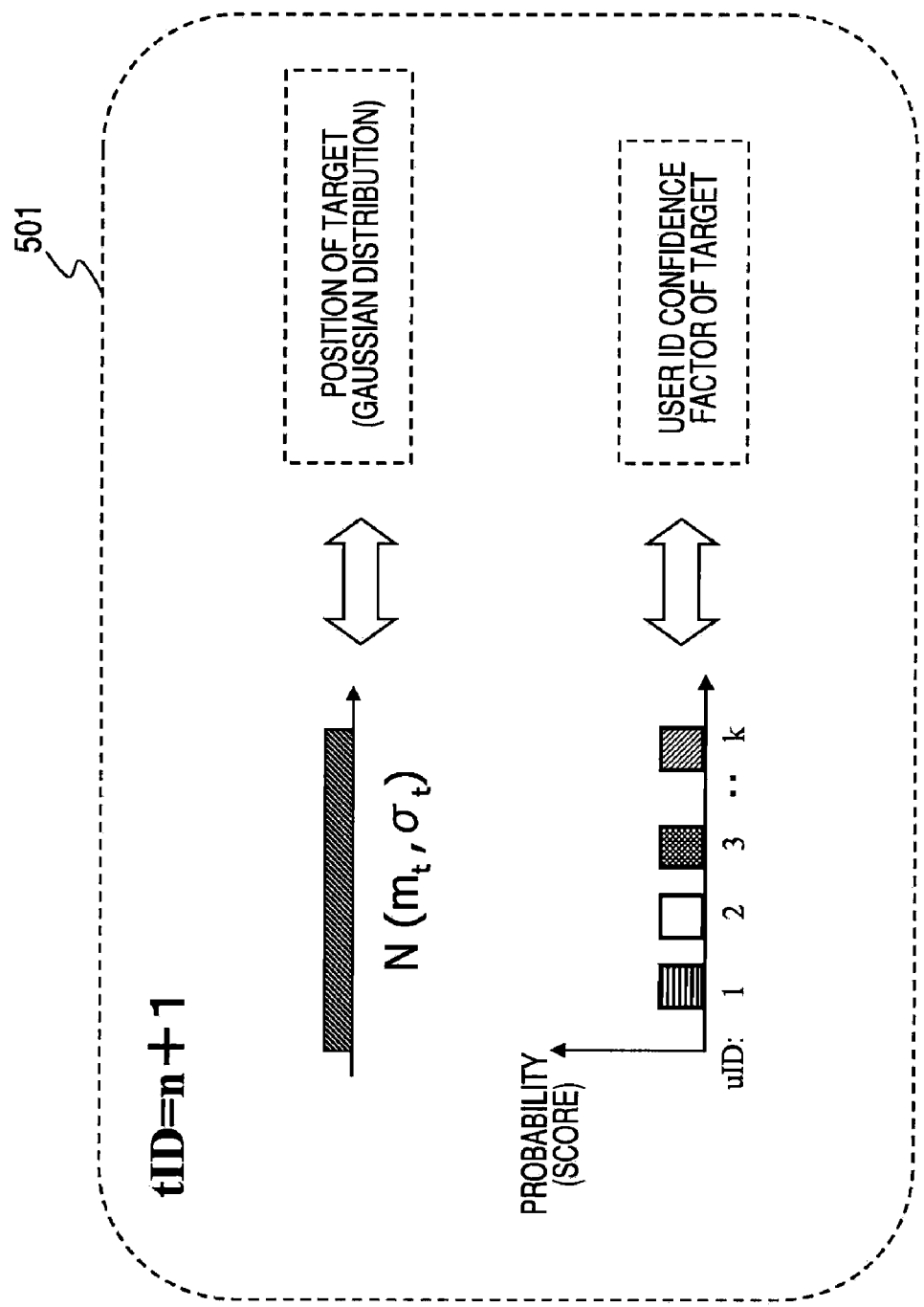
FIG. 11 is a diagram for explaining processing for generating a new target in the sound/image-integration processing unit 131.

In calculating an event-target likelihood between an event and respective existing n targets, the sound/image-integration processing unit 131 provisionally generates, as n+1th target, a new provisional target 501 with "position information" and "identification information" set in uniform distributions ("a Gaussian distribution with a sufficiently large variance" and "a User ID distribution in which all Pt[i]s are equal") as shown in FIG. 11.

After setting the provisional new target (tID=n+1), the sound/image-integration processing unit 131 performs the setting of event occurrence source hypotheses in step S102 in the flow explained with reference to FIG. 7 on the basis of an input of a new event. In this processing, the sound/image-integration processing unit 131 executes calculation of a likelihood between input event information and the respective targets and calculates target weights [$W_{tID}$] of the respective targets. In this case, the sound/image-integration processing unit 131 also executes the calculation of a likelihood between the input event information and the provisional target (tID=n+1) shown in FIG. 11 and calculates a target weight ($W_{n+1}$) of a provisional n+1th target.

When it is judged that the target weight ($W_{n+1}$) of the provisional n+1th target is larger than target weights ($W_1$ to $W_n$) of the existing n targets, the sound/image-integration processing unit 131 sets the new target for all the particles.

For example, there are plural face events in one image photographed by a camera and the processing of the flow shown in FIG. 7 is applied to each of the face events. In this case, when the number of faces (the number of events) in one image is smaller than the numbers of targets (n) set for the respective particles, even if the weight $W_{n+1}$ of the provisional target with tID=n+1 is not larger than the weights ($W_1$ to $W_n$) of the other targets, the provisional target may be directly generated for all the particles as a new target.

When the new target is generated, the generation of hypotheses of an event occurrence source may be probabilistically performed on the basis of the target weight [$W_{tID}$] calculated beforehand or hypotheses of an event occurrence source may be set as new targets in all the particles.

Deletion of a Target

Processing for deleting a target in the sound/image-integration processing unit 131 is explained with reference to FIG. 12. The sound/image-integration processing unit 131 executes deletion of a target, for example, in performing the processing for updating target data in step S105 in the processing flow shown in FIG. 7.

In step S105, as explained above, the sound/image-integration processing unit 131 performs processing for generating target information on the basis of the target data updated by execution of the update of the target data and the respective particle weights [$W_{pID}$] and outputting the target information to the processing determining unit 132. The sound/image-integration processing unit 131 generates, for example, target information 520 shown in FIG. 12. The target information is generated as information including (a) user position information and (b) user confidence factor information of the respective targets (tID=1 to n).

The sound/image-integration processing unit 131 pays attention to the user position information in the target information generated on the basis of the updated targets in this way. The user position information is set as a Gaussian distribution N(m, σ). When a fixed peak is not detected in the Gaussian distribution, the user position information is not effective information indicating a position of a specific user. The sound/image-integration processing unit 131 selects a target with such distribution data not having a peak as a deletion object.

Figure 12:
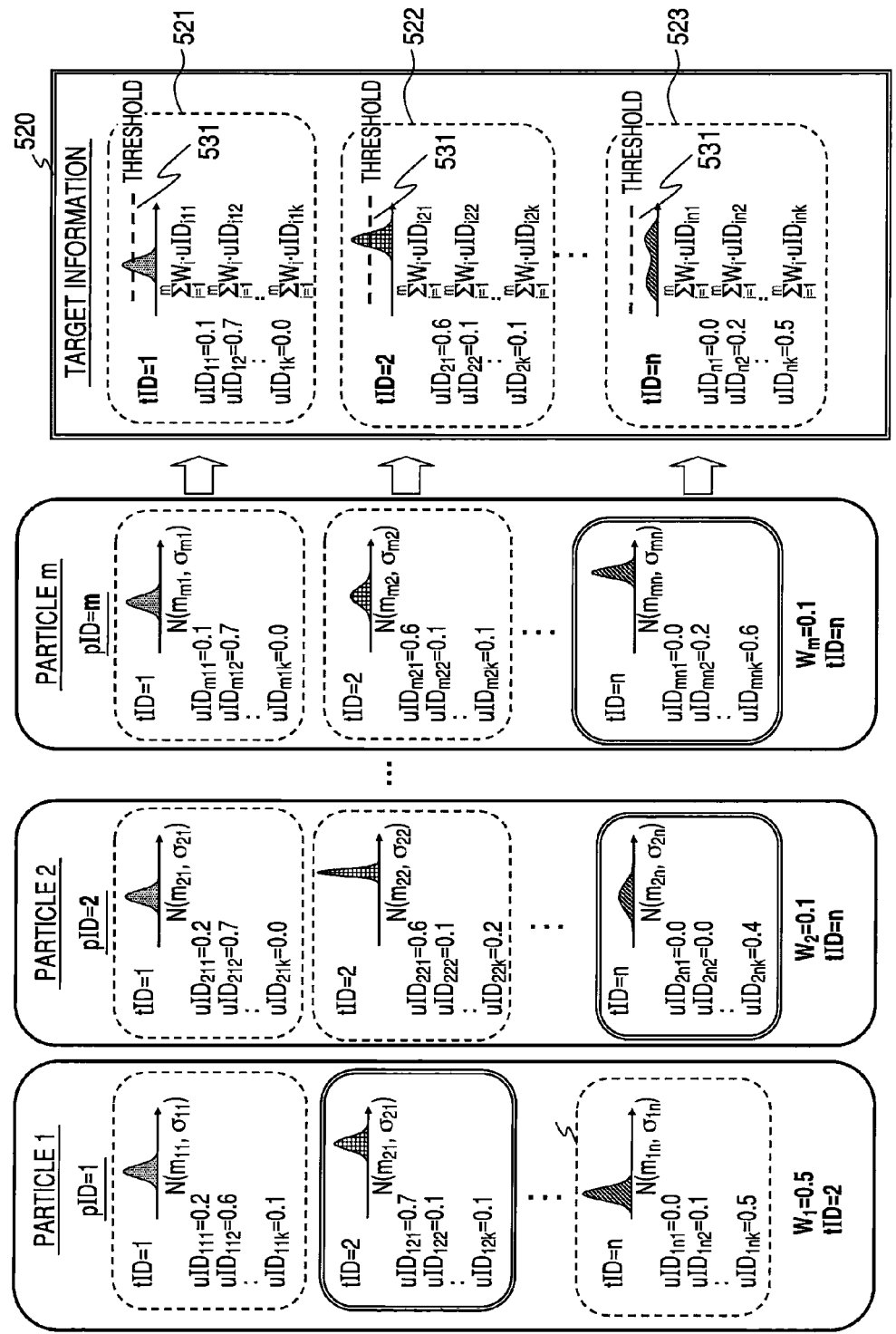
FIG. 12 is a diagram for explaining processing for deleting a target in the sound/image-integration processing unit 131.

For example, in the target information 520 shown in FIG. 12, three kinds of target information 521, 522, and 523 of targets 1, 2, and n are shown. The sound/image-integration processing unit 131 executes comparison of peaks of Gaussian distribution data indicating user positions in the target information and a threshold 531 set in advance. The sound/image-integration processing unit 131 sets data not having a peak equal to or higher than the threshold 531, i.e., in an example in FIG. 12, the target information 523 as a deletion target.

In this example, a target (tID=n) is selected as a deletion target and deleted from all the particles. When a maximum of a Gaussian distribution (a probability density distribution) indicating a user position is smaller than the threshold for deletion, a target with the Gaussian distribution is deleted from all the particles. The applied threshold may be a fixed value or may be changed for each target, for example, set lower for an interaction object target to prevent the interaction object target from being easily deleted.

The present invention has been explained in detail with reference to the specific embodiment. However, it is obvious that those skilled in the art can make correction and substitution of the embodiment without departing from the spirit of the present invention. In other words, the present invention has been disclosed in a form of illustration and should not be limitedly interpreted. To judge the gist of the present invention, the patent claims should be taken into account.

The series of processing explained in this specification can be executed by hardware, software, or a combination of the hardware and the software. When the processing by the software is executed, it is possible to install a program having a processing sequence recorded therein in a memory in a computer incorporated in dedicated hardware and cause the computer to execute the program or install the program in a general-purpose computer, which can execute various kinds of processing, and cause the general-purpose computer to execute the program. For example, the program can be recorded in a recording medium in advance. Besides installing the program from the recording medium to the computer, the program can be received through a network such as a LAN (Local Area Network) or the Internet and installed in a recording medium such as a built-in hard disk or the like.

The various kinds of processing described in this specification are not only executed in time series according to the description but may be executed in parallel or individually according to a processing ability of an apparatus that executes the processing or when necessary. In this specification, a system is a configuration of a logical set of plural apparatuses and is not limited to a system in which apparatuses having individual configurations are provided in an identical housing.

As explained above, according to the embodiment of the present invention, event information including estimated position and estimated identification data of users is inputted on the basis of image information or sound information acquired by a camera or a microphone, particle filtering processing to which plural particles set with plural targets are applied is performed, and position and identification information of the users is generated on the basis of update and selection of hypotheses by filtering. According to the embodiment, it is possible to efficiently leave most likely information even if uncertain and asynchronous position information and identification information are inputted as input information and it is possible to efficiently and surely generate user position and user identification information.

It should be understood by those skilled in the art that various modifications, combinations, sub-combinations, and alterations may occur depending on design requirements and other factors insofar as they are within the scope of the appended claims or the equivalents thereof.

What is claimed is:

1. An information processing apparatus comprising:
   plural information input units that input information including image information or sound information in an actual space;
   an event detecting unit that generates event information including estimated position information and estimated identification information of users present in the actual space by analyzing the information inputted from the plural information input units, wherein:
   the event detecting unit comprises a sound-event detecting unit and an image-event detecting unit;
   the sound-event detecting unit generates identification information of users on the basis of comparison processing with characteristic information of user voices registered in advance; and
   the image-event detecting unit generates user identification information on the basis of comparison processing with characteristic information of user faces registered in advance; and an information-integration processing unit that:
> sets probability distribution data of hypotheses concerning position and identification information of the users;
> inputs the event information generated by the event detecting unit;
> executes particle filtering processing to which plural particles set with plural targets corresponding to virtual users are applied;
> executes update processing for the targets set for the respective particles taking into account elapsed time; and
> executes generation of analysis information including user position information and user identification information of the users present in the actual space by updating and selecting the hypotheses on the basis of the event information.

2. An information processing apparatus according to claim 1, wherein
> the event detecting unit generates event information including estimated position information of users including a Gaussian distribution and user confidence factor information indicating probability values corresponding to the users, and
> the information-integration processing unit holds particles set with plural targets having user position information including a Gaussian distribution corresponding to virtual users and user confidence factor information indicating probability values corresponding to the users, calculates event-target likelihoods that are indication values of similarities between the targets set for the respective particles and the event information, and executes particle setting processing with the target having a higher one of the event-target likelihoods preferentially set as an event occurrence source hypothesis target.

3. An information processing apparatus according to claim 2, wherein the information-integration processing unit calculates sum data of the event-target likelihoods and particle weights set for the respective particles as target weights and executes particle setting processing with a target having a large target weight preferentially set as an event occurrence source hypothesis target.

4. An information processing apparatus according to claim 2, wherein the information-integration processing unit calculates likelihoods between event occurrence source hypothesis targets set for the respective particles and the event information inputted from the event detecting unit and sets values corresponding to levels of the likelihoods for the respective particles as particle weights.

5. An information processing apparatus according to claim 4, wherein the information-integration processing unit executes re-sampling processing for preferentially reselecting the particle having a larger one of the particle weights and performs update processing for the particle.

6. An information processing apparatus according to claim 2, wherein the information-integration processing unit performs, concerning event occurrence source hypothesis targets set for the respective particles, update processing to which the event information generated by the event detecting unit is applied.

7. An information processing apparatus according to claim 4, wherein the information-integration processing unit generates target information in which an integrated sum of target data and the particle weights set for the respective particles is set as user position information and user identification information corresponding to the respective targets.

8. An information processing apparatus according to claim 2, wherein the information-integration processing unit generates signal information as a probability value of an event occurrence source according to numbers of event occurrence source hypothesis targets set for the respective particles.

9. An information processing apparatus according to claim 2, wherein the information-integration processing unit generates a provisional target having user position information and user identification information including uniform data and performs, when a likelihood between the provisional target and the event information generated by the event detecting unit is a value larger than an event-target likelihood corresponding to an existing target, processing for adding the provisional target to the respective particles anew.

10. An information processing apparatus according to claim 4, wherein the information-integration processing unit executes, when a peak value of Gaussian distribution data as user position information included in an integrated sum of target data and the particle weights set for the respective particles is smaller than a threshold set in advance, processing for deleting the target.

11. An information processing method for executing information analysis processing in an information processing apparatus, the information processing method comprising:
> an information inputting step in which plural information input units input information including image information or sound information in an actual space;
> an event detecting step in which an event detecting unit generates event information including estimated position information and estimated identification information of users present in the actual space by analyzing the information inputted in the information inputting step, wherein:
>> the event detecting unit comprises a sound-event detecting unit and an image-event detecting unit;
>> the sound-event detecting unit generates identification information of users on the basis of comparison processing with characteristic information of user voices registered in advance; and
>> the image-event detecting unit generates user identification information on the basis of comparison processing with characteristic information of user faces registered in advance; and
>
> an information-integration processing step in which an information-integration processing unit:
>> sets probability distribution data of hypotheses concerning position and identification information of the users;
>> inputs the event information generated by the event detecting unit;
>> executes particle filtering processing to which plural particles set with plural targets corresponding to virtual users are applied;
>> executes update processing for the targets set for the respective particles taking into account elapsed time; and
>> executes generation of analysis information including user position information and user identification information of the users present in the actual space by updating and selecting the hypotheses on the basis of the event information.

12. An information processing method according to claim 11, wherein
> the event detecting step is a step of generating event information including estimated position information of users including a Gaussian distribution and user confidence factor information indicating probability values corresponding to the users, the information-integration processing unit holds particles set with plural targets having user position information including a Gaussian distribution corresponding to virtual users and user confidence factor information indicating probability values corresponding to the users, and the information-integration processing step is a step of calculating event-target likelihoods that are indication values of similarities between the targets set for the respective particles and the event information and executing particle setting processing with the target having a higher one of the event-target likelihoods preferentially set as an event occurrence source hypothesis target.

13. An information processing method according to claim 12, wherein the information-integration processing step is a step of calculating sum data of the event-target likelihoods and particle weights set for the respective particles as target weights and executing particle setting processing with a target having a large target weight preferentially set as an event occurrence source hypothesis target.

14. An information processing method according to claim 12, wherein the information-integration processing step is a step of calculating likelihoods between event occurrence source hypothesis targets set for the respective particles and the event information inputted from the event detecting unit and setting values corresponding to levels of the likelihoods for the respective particles as particle weights.

15. An information processing method according to claim 14, wherein the information-integration processing step is a step of executing re-sampling processing for preferentially reselecting the particle having a larger one of the particle weights and performing update processing for the particle.

16. An information processing method according to claim 12, wherein the information-integration processing step is a step of performing, concerning event occurrence source hypothesis targets set for the respective particles, update processing to which the event information generated by the event detecting unit is applied.

17. An information processing method according to claim 14, wherein the information-integration processing step is a step of generating target information in which an integrated sum of target data and the particle weights set for the respective particles is set as user position information and user identification information corresponding to the respective targets.

18. An information processing method according to claim 12, wherein the information-integration processing step is a step of generating signal information as a probability value of an event occurrence source according to numbers of event occurrence source hypothesis targets set for the respective particles.

19. An information processing method according to claim 12, wherein the information-integration processing step includes a step of generating a provisional target having user position information and user identification information including uniform data and performing, when a likelihood between the provisional target and the event information generated by the event detecting unit is a value larger than an event-target likelihood corresponding to an existing target, processing for adding the provisional target to the respective particles anew.

20. An information processing method according to claim 14, wherein the information-integration processing step includes a step of executing, when a peak value of Gaussian distribution data as user position information included in an integrated sum of target data and the particle weights set for the respective particles is smaller than a threshold set in advance, processing for deleting the target.

21. A non-transitory computer-readable medium for causing an information processing apparatus to execute information analysis processing, the non-transitory computer-readable medium causing the information processing apparatus to execute:

an information inputting step of causing plural information input units to input information including image information or sound information in an actual space;

an event detecting step of causing an event detecting unit to generate event information including estimated position information and estimated identification information of users present in the actual space by analyzing the information inputted in the information inputting step, wherein:

the event detecting unit comprises a sound-event detecting unit and an image-event detecting unit;

the sound-event detecting unit generates identification information of users on the basis of comparison processing with characteristic information of user voices registered in advance; and the image-event detecting unit generates user identification information on the basis of comparison processing with characteristic information of user faces registered in advance; and an information-integration processing step of causing an information-integration processing unit to:

set probability distribution data of hypotheses concerning position and identification information of the users;

input the event information generated by the event detecting unit;

execute particle filtering processing to which plural particles set with plural targets corresponding to virtual users are applied;

execute update processing for the targets set for the respective particles taking into account elapsed time; and execute generation of analysis information including user position information and user identification information of the users present in the actual space by updating and selecting the hypotheses on the basis of the event information.

* * * * *